(12) United States Patent
Nall et al.

(10) Patent No.: US 9,074,778 B2
(45) Date of Patent: *Jul. 7, 2015

(54) COOKING APPLIANCE SURFACES HAVING SPILL CONTAINMENT PATTERN

(75) Inventors: Bradley M. Nall, Elizabethtown, KY (US); John P. Driver, Henryville, IN (US); Matthew McMillin, Palmyra, IN (US)

(73) Assignee: SSW Holding Company, Inc., Fort Smith, AR (US)

( * ) Notice: Subject to any disclaimer, the term of this patent is extended or adjusted under 35 U.S.C. 154(b) by 59 days.

This patent is subject to a terminal disclaimer.

(21) Appl. No.: 13/505,205

(22) PCT Filed: Nov. 1, 2010

(86) PCT No.: PCT/US2010/054936
§ 371 (c)(1),
(2), (4) Date: Apr. 30, 2012

(87) PCT Pub. No.: WO2011/056742
PCT Pub. Date: May 12, 2011

(65) Prior Publication Data
US 2012/0216880 A1     Aug. 30, 2012

Related U.S. Application Data

(60) Provisional application No. 61/258,124, filed on Nov. 4, 2009.

(51) Int. Cl.
*F24C 15/10*     (2006.01)
*C03C 15/00*     (2006.01)
(Continued)

(52) U.S. Cl.
CPC ........... *F24C 15/10* (2013.01); *Y10T 137/5762* (2015.04); *C03C 15/00* (2013.01); *C03C 17/28* (2013.01); *C03C 19/00* (2013.01); *C03C 2217/76* (2013.01); *F24C 15/005* (2013.01)

(58) Field of Classification Search
USPC ..................................................... 501/14, 17
See application file for complete search history.

(56) References Cited

U.S. PATENT DOCUMENTS 392,061 A     10/1888   Peckham
870,439 A     11/1907   Kade
(Continued)

FOREIGN PATENT DOCUMENTS

CA     2175848     1/2000
CA     2436871     2/2004
(Continued)

OTHER PUBLICATIONS

"Fumed Silica", Prodexim (downloaded 2012).
(Continued)

*Primary Examiner* — Dana Ross
*Assistant Examiner* — John J Norton
(74) *Attorney, Agent, or Firm* — Marshall, Gerstein & Borun LLP

(57) ABSTRACT

A pattern of high temperature hydrophobic surfaces for use with cooking and baking appliances, such as kitchen cooktops, stoves and oven interior walls. The pattern of hydrophobic surfaces confines overflowed liquids to the enclosed non-hydrophobic surface areas and away from protected areas, such as around burner control knobs, burner surfaces, cal rods, fan and vent openings, countertops, and the like. The hydrophobic materials used are able to withstand and effectively repel liquids at high operating temperatures.

24 Claims, 8 Drawing Sheets

(51) Int. Cl.
    *C03C 17/28*    (2006.01)
    *C03C 19/00*    (2006.01)
    *F24C 15/00*    (2006.01)

(56) References Cited

U.S. PATENT DOCUMENTS

| | | | |
|---|---|---|---|
| 2,191,701 A | 2/1940 | Wood | |
| 2,976,386 A * | 3/1961 | Salton | 219/450.1 |
| 3,185,426 A | 5/1965 | Bjerke | |
| 3,354,022 A | 11/1967 | Dettre et al. | |
| 3,579,540 A | 5/1971 | Ohlhausen | |
| 3,673,292 A | 6/1972 | Kock | |
| 3,716,502 A | 2/1973 | Loew | |
| 3,931,428 A | 1/1976 | Reick | |
| 3,963,349 A | 6/1976 | Albright et al. | |
| 3,967,030 A | 6/1976 | Johnson et al. | |
| 3,975,197 A | 8/1976 | Mikelsons | |
| 3,976,572 A | 8/1976 | Reick | |
| 3,980,153 A | 9/1976 | Andrews | |
| 4,120,798 A | 10/1978 | Mischutin | |
| 4,142,724 A | 3/1979 | Reick | |
| 4,151,327 A | 4/1979 | Lawton | |
| 4,184,936 A | 1/1980 | Paul et al. | |
| 4,199,142 A | 4/1980 | Reick | |
| 4,301,197 A | 11/1981 | Franz et al. | |
| 4,301,213 A | 11/1981 | Davies | |
| 4,311,755 A | 1/1982 | Rummel | |
| 4,345,465 A | 8/1982 | Gruner et al. | |
| 4,415,405 A | 11/1983 | Ruddle et al. | |
| 4,442,324 A | 4/1984 | Blanchard et al. | |
| 4,451,619 A | 5/1984 | Heilmann et al. | |
| 4,452,834 A | 6/1984 | Nachtkamp et al. | |
| 4,453,533 A | 6/1984 | Scheidler et al. | |
| 4,483,784 A | 11/1984 | Temple | |
| 4,492,217 A | 1/1985 | Scheidler | |
| 4,493,917 A | 1/1985 | Bailleux et al. | |
| 4,495,238 A | 1/1985 | Adiletta | |
| 4,520,073 A | 5/1985 | Randolph et al. | |
| 4,581,149 A | 4/1986 | Horodysky et al. | |
| 4,591,530 A | 5/1986 | Lui | |
| 4,594,311 A | 6/1986 | Frisch et al. | |
| 4,614,464 A | 9/1986 | Christensen | |
| 4,624,900 A | 11/1986 | Fau | |
| 4,646,948 A | 3/1987 | Jennings | |
| 4,680,173 A | 7/1987 | Burger | |
| 4,687,707 A | 8/1987 | Matsuo et al. | |
| 4,717,810 A | 1/1988 | Schreder | |
| 4,728,578 A | 3/1988 | Higgins et al. | |
| 4,733,843 A | 3/1988 | Bessinger | |
| 4,738,426 A | 4/1988 | Bessinger | |
| D295,950 S | 5/1988 | Johnston | |
| 4,749,110 A | 6/1988 | Maeno et al. | |
| 4,753,977 A | 6/1988 | Merrill | |
| 4,782,112 A | 11/1988 | Kondo et al. | |
| 4,835,014 A | 5/1989 | Roth et al. | |
| 4,835,217 A | 5/1989 | Jorgensen et al. | |
| 4,855,176 A | 8/1989 | Ohwaki et al. | |
| 4,870,907 A | 10/1989 | McKee | |
| 4,923,260 A | 5/1990 | Poulsen | |
| 4,954,611 A | 9/1990 | Chen, Sr. et al. | |
| 4,963,647 A | 10/1990 | Vora et al. | |
| 4,971,912 A | 11/1990 | Buhl et al. | |
| 4,983,459 A | 1/1991 | Franz et al. | |
| 4,987,049 A | 1/1991 | Komamura et al. | |
| 5,009,652 A | 4/1991 | Morgan et al. | |
| 5,011,727 A | 4/1991 | Kido et al. | |
| 5,011,963 A | 4/1991 | Ogawa et al. | |
| 5,030,507 A | 7/1991 | Mudge et al. | |
| 5,032,641 A | 7/1991 | Nanishi et al. | |
| 5,041,304 A | 8/1991 | Kusano et al. | |
| 5,057,050 A | 10/1991 | Hill | |
| 5,084,191 A | 1/1992 | Nagase et al. | |
| 5,110,655 A | 5/1992 | Engler et al. | |
| 5,121,134 A | 6/1992 | Albinson et al. | |
| 5,156,611 A | 10/1992 | Haynes et al. | |
| 5,202,361 A | 4/1993 | Zimmerman et al. | |
| 5,203,696 A | 4/1993 | Gonser | |
| 5,225,274 A | 7/1993 | Ogawa et al. | |
| 5,228,764 A | 7/1993 | Cherry et al. | |
| 5,228,905 A | 7/1993 | Grunewalder et al. | |
| 5,238,746 A | 8/1993 | Soga et al. | |
| 5,240,774 A | 8/1993 | Ogawa et al. | |
| 5,244,726 A | 9/1993 | Laney et al. | |
| 5,246,762 A | 9/1993 | Nakamura | |
| 5,273,354 A | 12/1993 | Herrmann et al. | |
| 5,274,159 A | 12/1993 | Pellerite et al. | |
| 5,284,707 A | 2/1994 | Ogawa et al. | |
| 5,294,252 A | 3/1994 | Gun | |
| 5,300,239 A | 4/1994 | Ozaki et al. | |
| 5,308,705 A | 5/1994 | Franz et al. | |
| 5,316,799 A | 5/1994 | Brunken et al. | |
| 5,317,129 A | 5/1994 | Taplan et al. | |
| 5,324,566 A | 6/1994 | Ogawa et al. | |
| 5,324,877 A | 6/1994 | West et al. | |
| 5,328,768 A | 7/1994 | Goodwin | |
| 5,338,345 A | 8/1994 | Scarborough et al. | |
| 5,348,547 A | 9/1994 | Payne et al. | |
| 5,352,733 A | 10/1994 | Hart | |
| 5,362,145 A | 11/1994 | Bird et al. | |
| 5,364,299 A | 11/1994 | Hill et al. | |
| 5,366,810 A | 11/1994 | Merrifield et al. | |
| 5,368,892 A | 11/1994 | Berquier | |
| 5,372,888 A | 12/1994 | Ogawa et al. | |
| 5,380,585 A | 1/1995 | Ogawa et al. | |
| 5,382,558 A | 1/1995 | Inagaki et al. | |
| 5,385,966 A | 1/1995 | Hermansen et al. | |
| 5,395,657 A | 3/1995 | Strepparola et al. | |
| 5,424,130 A | 6/1995 | Nakanishi et al. | |
| 5,429,433 A | 7/1995 | Bird et al. | |
| 5,435,839 A | 7/1995 | Ogawa | |
| 5,437,894 A | 8/1995 | Ogawa et al. | |
| 5,437,900 A | 8/1995 | Kuzowski | |
| 5,441,338 A | 8/1995 | Kane et al. | |
| 5,458,976 A | 10/1995 | Horino et al. | |
| 5,464,492 A | 11/1995 | Gregory et al. | |
| 5,466,770 A | 11/1995 | Audenaert et al. | |
| 5,489,328 A | 2/1996 | Ono et al. | |
| 5,500,216 A | 3/1996 | Julian et al. | |
| 5,540,493 A | 7/1996 | Kane et al. | |
| 5,556,667 A | 9/1996 | Teranishi et al. | |
| 5,558,940 A | 9/1996 | Michels et al. | |
| 5,564,809 A | 10/1996 | Kane et al. | |
| 5,576,096 A | 11/1996 | Ono et al. | |
| 5,577,817 A | 11/1996 | Reynolds | |
| 5,578,361 A | 11/1996 | Tsujioka et al. | |
| 5,584,957 A | 12/1996 | Schultheis et al. | |
| 5,585,896 A | 12/1996 | Yamazaki et al. | |
| 5,590,861 A | 1/1997 | Ardolino | |
| 5,599,893 A | 2/1997 | Asai et al. | |
| 5,612,130 A | 3/1997 | Smirnov et al. | |
| 5,612,433 A | 3/1997 | Ono et al. | |
| 5,618,627 A | 4/1997 | Merrifield et al. | |
| 5,636,256 A | 6/1997 | Matumura et al. | |
| 5,651,921 A | 7/1997 | Kaijou | |
| 5,656,759 A | 8/1997 | Ito et al. | |
| 5,674,967 A | 10/1997 | Goodwin | |
| 5,679,460 A | 10/1997 | Schakenraad et al. | |
| 5,688,864 A | 11/1997 | Goodwin | |
| 5,697,991 A | 12/1997 | Frazer | |
| 5,703,147 A | 12/1997 | Martin et al. | |
| 5,707,740 A | 1/1998 | Goodwin | |
| 5,725,789 A | 3/1998 | Huber et al. | |
| 5,735,589 A | 4/1998 | Herrmann et al. | |
| 5,747,561 A | 5/1998 | Smirnov et al. | |
| 5,753,734 A | 5/1998 | Maruyama | |
| 5,798,144 A | 8/1998 | Varanasi et al. | |
| 5,800,785 A | 9/1998 | Bochner | |
| 5,800,918 A | 9/1998 | Chartier et al. | |
| 5,813,741 A | 9/1998 | Fish et al. | |
| 5,814,411 A | 9/1998 | Merrifield et al. | |
| 5,824,421 A | 10/1998 | Kobayashi et al. | |
| 5,830,529 A | 11/1998 | Ross | |
| 5,834,600 A | 11/1998 | Hida et al. | |
| 5,840,201 A | 11/1998 | Elledge | |

(56) References Cited

U.S. PATENT DOCUMENTS

| | | | |
|---|---|---|---|
| 5,843,338 A | 12/1998 | Inoue et al. | |
| 5,853,690 A | 12/1998 | Hibino et al. | |
| 5,853,800 A | 12/1998 | Dombrowski et al. | |
| 5,856,378 A | 1/1999 | Ring et al. | |
| 5,858,551 A | 1/1999 | Salsman | |
| 5,876,806 A | 3/1999 | Ogawa | |
| 5,890,907 A | 4/1999 | Minasian | |
| 5,910,557 A | 6/1999 | Audenaert et al. | |
| 5,921,411 A | 7/1999 | Merl | |
| 5,924,359 A | 7/1999 | Watanabe | |
| 5,945,482 A | 8/1999 | Fukuchi et al. | |
| 5,947,574 A | 9/1999 | Avendano | |
| 5,948,685 A * | 9/1999 | Angros | 436/63 |
| 5,952,053 A | 9/1999 | Colby | |
| 5,958,601 A | 9/1999 | Salsman | |
| 5,980,990 A | 11/1999 | Goodwin | |
| 5,989,757 A | 11/1999 | Satoi | |
| 6,013,724 A | 1/2000 | Mizutani et al. | |
| 6,017,609 A | 1/2000 | Akamatsu et al. | |
| 6,017,831 A | 1/2000 | Beardsley et al. | |
| 6,017,997 A | 1/2000 | Snow et al. | |
| 6,024,948 A | 2/2000 | Samain et al. | |
| 6,025,025 A | 2/2000 | Bartrug et al. | |
| 6,033,738 A | 3/2000 | Teranishi et al. | |
| 6,045,650 A | 4/2000 | Mitchnick et al. | |
| 6,068,911 A | 5/2000 | Shouji et al. | |
| 6,090,447 A | 7/2000 | Suzuki et al. | |
| 6,093,559 A | 7/2000 | Bookbinder et al. | |
| 6,096,380 A | 8/2000 | Takebe et al. | |
| 6,105,233 A | 8/2000 | Neal | |
| 6,114,446 A | 9/2000 | Narisawa et al. | |
| 6,117,555 A | 9/2000 | Fujimori et al. | |
| 6,119,626 A | 9/2000 | Miyazawa et al. | |
| 6,120,720 A | 9/2000 | Meier et al. | |
| 6,136,210 A | 10/2000 | Biegelsen et al. | |
| 6,149,978 A | 11/2000 | Bladel et al. | |
| 6,153,304 A | 11/2000 | Smith et al. | |
| 6,155,677 A | 12/2000 | Kitani et al. | |
| 6,187,143 B1 | 2/2001 | Juppo et al. | |
| 6,191,122 B1 | 2/2001 | Lux et al. | |
| 6,197,438 B1 * | 3/2001 | Faulkner | 428/627 |
| 6,201,058 B1 | 3/2001 | Mahr et al. | |
| 6,207,236 B1 | 3/2001 | Araki et al. | |
| 6,221,434 B1 | 4/2001 | Visca et al. | |
| 6,224,974 B1 | 5/2001 | Wuu | |
| 6,228,435 B1 | 5/2001 | Yoshikawa et al. | |
| 6,228,972 B1 | 5/2001 | Hikita et al. | |
| 6,235,383 B1 | 5/2001 | Hong et al. | |
| 6,235,833 B1 | 5/2001 | Akamatsu et al. | |
| 6,245,387 B1 | 6/2001 | Hayden | |
| 6,264,751 B1 | 7/2001 | Kamura et al. | |
| 6,280,834 B1 | 8/2001 | Veerasamy et al. | |
| 6,290,803 B1 | 9/2001 | Maksymkiw et al. | |
| 6,291,054 B1 | 9/2001 | Thomas et al. | |
| 6,296,685 B1 | 10/2001 | Cammann et al. | |
| 6,308,728 B1 | 10/2001 | Frazier | |
| 6,333,074 B1 | 12/2001 | Ogawa et al. | |
| 6,333,558 B1 | 12/2001 | Hasegawa | |
| 6,337,133 B1 | 1/2002 | Akamatsu et al. | |
| 6,340,502 B1 | 1/2002 | Azzopardi et al. | |
| 6,342,268 B1 | 1/2002 | Samain | |
| 6,352,758 B1 * | 3/2002 | Huang et al. | 428/143 |
| 6,358,569 B1 | 3/2002 | Badyal et al. | |
| 6,361,868 B1 | 3/2002 | Bier et al. | |
| 6,371,034 B1 | 4/2002 | Simpson et al. | |
| 6,372,290 B1 | 4/2002 | Berkenkoetter et al. | |
| 6,372,507 B1 | 4/2002 | Angros | |
| 6,376,592 B1 | 4/2002 | Shimada et al. | |
| 6,379,751 B1 | 4/2002 | Schafer et al. | |
| 6,383,642 B1 | 5/2002 | Le Bellac et al. | |
| 6,403,397 B1 | 6/2002 | Katz | |
| 6,419,985 B1 | 7/2002 | Ishizuka | |
| 6,422,673 B1 | 7/2002 | Bienick | |
| 6,423,372 B1 | 7/2002 | Genzer et al. | |
| 6,447,897 B1 | 9/2002 | Liang et al. | |
| 6,451,432 B1 | 9/2002 | Azzopardi et al. | |
| 6,458,420 B1 | 10/2002 | Akamatsu et al. | |
| 6,461,537 B1 | 10/2002 | Turcotte et al. | |
| 6,461,670 B2 | 10/2002 | Akamatsu et al. | |
| 6,462,115 B1 | 10/2002 | Takahashi et al. | |
| 6,471,761 B2 | 10/2002 | Fan et al. | |
| 6,476,095 B2 | 11/2002 | Simendinger, III | |
| 6,479,612 B1 | 11/2002 | Del Pesco et al. | |
| 6,482,524 B1 | 11/2002 | Yamamoto et al. | |
| 6,488,347 B1 | 12/2002 | Bienick | |
| 6,555,384 B1 | 4/2003 | Angros | |
| 6,564,935 B1 | 5/2003 | Yamamoto et al. | |
| 6,579,620 B2 | 6/2003 | Mizuno et al. | |
| 6,582,825 B2 | 6/2003 | Amarasekera et al. | |
| 6,584,744 B1 | 7/2003 | Schultheis et al. | |
| 6,589,641 B1 | 7/2003 | Stirniman et al. | |
| 6,596,060 B1 | 7/2003 | Michaud | |
| 6,610,363 B2 | 8/2003 | Arora et al. | |
| 6,613,860 B1 | 9/2003 | Dams et al. | |
| 6,623,863 B2 | 9/2003 | Kamitani et al. | |
| 6,641,654 B2 | 11/2003 | Akamatsu et al. | |
| 6,649,222 B1 | 11/2003 | D'Agostino et al. | |
| 6,652,640 B2 | 11/2003 | Asai et al. | |
| 6,660,339 B1 | 12/2003 | Datta et al. | |
| 6,660,363 B1 | 12/2003 | Barthlott | |
| 6,660,686 B2 | 12/2003 | Inagaki et al. | |
| 6,679,573 B2 | 1/2004 | Bienick | |
| 6,683,126 B2 | 1/2004 | Keller et al. | |
| 6,685,992 B1 | 2/2004 | Ogawa et al. | |
| 6,689,200 B2 | 2/2004 | Scarborough et al. | |
| 6,692,565 B2 | 2/2004 | Johansen, Jr. et al. | |
| 6,706,798 B2 | 3/2004 | Kobayashi et al. | |
| 6,713,304 B2 | 3/2004 | Angros | |
| 6,720,371 B2 | 4/2004 | Furuta et al. | |
| 6,729,704 B2 | 5/2004 | Ames | |
| 6,743,467 B1 | 6/2004 | Jones et al. | |
| 6,767,984 B2 | 7/2004 | Toui et al. | |
| 6,770,323 B2 | 8/2004 | Genzer et al. | |
| 6,780,497 B1 | 8/2004 | Walter | |
| 6,786,562 B2 | 9/2004 | Obrock et al. | |
| 6,793,821 B2 | 9/2004 | Lee et al. | |
| 6,800,354 B2 | 10/2004 | Baumann et al. | |
| 6,806,299 B2 | 10/2004 | Baumann et al. | |
| 6,808,835 B2 | 10/2004 | Green et al. | |
| 6,811,045 B1 | 11/2004 | Masker et al. | |
| 6,811,716 B1 | 11/2004 | Stengard et al. | |
| 6,811,844 B2 | 11/2004 | Trouilhet | |
| 6,818,451 B2 | 11/2004 | Angros | |
| 6,845,788 B2 | 1/2005 | Extrand | |
| 6,852,390 B2 | 2/2005 | Extrand | |
| 6,855,375 B2 | 2/2005 | Nakagawa et al. | |
| 6,855,759 B2 | 2/2005 | Kudo et al. | |
| 6,858,284 B2 | 2/2005 | Nun et al. | |
| 6,871,923 B2 | 3/2005 | Dietz et al. | |
| 6,872,441 B2 * | 3/2005 | Baumann et al. | 428/142 |
| 6,890,360 B2 | 5/2005 | Cole et al. | |
| 6,921,506 B1 | 7/2005 | Mitchell et al. | |
| 6,923,216 B2 | 8/2005 | Extrand et al. | |
| 6,926,946 B2 | 8/2005 | Ogawa et al. | |
| 6,931,888 B2 | 8/2005 | Shekunov et al. | |
| 6,938,774 B2 | 9/2005 | Extrand | |
| 6,942,746 B2 | 9/2005 | Niejelow et al. | |
| 6,956,080 B2 | 10/2005 | Scholz et al. | |
| 6,966,990 B2 | 11/2005 | Chattopadhyay et al. | |
| 6,976,585 B2 | 12/2005 | Extrand | |
| 6,976,998 B2 | 12/2005 | Rizzo et al. | |
| 6,982,242 B2 | 1/2006 | Liss et al. | |
| 6,994,045 B2 | 2/2006 | Paszkowski | |
| 6,998,051 B2 | 2/2006 | Chattopadhyay et al. | |
| 7,019,069 B2 | 3/2006 | Kobayashi et al. | |
| 7,022,416 B2 | 4/2006 | Teranishi | |
| 7,026,018 B2 | 4/2006 | Kranovich | |
| 7,037,591 B2 | 5/2006 | Henze et al. | |
| 7,048,889 B2 | 5/2006 | Arney et al. | |
| 7,052,244 B2 | 5/2006 | Fouillet et al. | |
| 7,056,409 B2 | 6/2006 | Dubrow | |
| 7,057,832 B2 | 6/2006 | Wu et al. | |
| 7,057,881 B2 | 6/2006 | Chow et al. | |
| 7,074,273 B2 | 7/2006 | Shimomura et al. | |

(56) References Cited

U.S. PATENT DOCUMENTS

| | | | |
|---|---|---|---|
| 7,074,294 | B2 | 7/2006 | Dubrow |
| 7,083,748 | B2 | 8/2006 | Chattopadhyay et al. |
| 7,083,828 | B2 | 8/2006 | Muller et al. |
| 7,108,833 | B2 | 9/2006 | Samsoondar |
| 7,109,256 | B2 | 9/2006 | Amano et al. |
| 7,112,369 | B2 | 9/2006 | Wang et al. |
| 7,148,181 | B2 | 12/2006 | Tanaka et al. |
| 7,150,904 | B2 | 12/2006 | D'Urso et al. |
| 7,153,357 | B2 | 12/2006 | Baumgart et al. |
| 7,157,018 | B2 | 1/2007 | Scheidler |
| 7,166,235 | B2 | 1/2007 | Majeti et al. |
| 7,175,723 | B2 | 2/2007 | Jones et al. |
| 7,179,758 | B2 | 2/2007 | Chakrapani et al. |
| 7,179,864 | B2 | 2/2007 | Wang |
| 7,188,917 | B2 | 3/2007 | Bienick |
| 7,198,855 | B2 | 4/2007 | Liebmann-Vinson et al. |
| 7,204,298 | B2 | 4/2007 | Hodes et al. |
| 7,211,223 | B2 | 5/2007 | Fouillet et al. |
| 7,211,313 | B2 | 5/2007 | Nun et al. |
| 7,211,329 | B2 | 5/2007 | Metz et al. |
| 7,211,605 | B2 | 5/2007 | Coronado et al. |
| 7,213,309 | B2 | 5/2007 | Wang et al. |
| D547,640 | S | 7/2007 | Remmers |
| 7,238,751 | B2 | 7/2007 | Wang et al. |
| 7,253,130 | B2 | 8/2007 | Chiang et al. |
| 7,258,731 | B2 | 8/2007 | D'Urso et al. |
| 7,261,768 | B2 | 8/2007 | Luten et al. |
| 7,264,845 | B2 | 9/2007 | Papadaki et al. |
| 7,265,468 | B1 | 9/2007 | Manel et al. |
| 7,273,658 | B2 | 9/2007 | Benayoun et al. |
| 7,285,331 | B1 | 10/2007 | Reihs et al. |
| 7,288,311 | B2 | 10/2007 | Kawashima et al. |
| 7,291,653 | B2 | 11/2007 | Baumann et al. |
| 7,306,304 | B2 | 12/2007 | Jang |
| 7,306,895 | B2 | 12/2007 | Kano et al. |
| 7,309,278 | B2 | 12/2007 | Shibata |
| 7,312,057 | B2 | 12/2007 | Bookbinder et al. |
| 7,323,033 | B2 | 1/2008 | Kroupenkine et al. |
| 7,338,835 | B2 | 3/2008 | Bao |
| 7,342,551 | B2 | 3/2008 | King |
| 7,344,619 | B2 | 3/2008 | Helmeke |
| 7,344,758 | B2 | 3/2008 | Franchina et al. |
| 7,344,783 | B2 | 3/2008 | Shea |
| 7,354,328 | B2 | 4/2008 | Lee |
| 7,354,624 | B2 | 4/2008 | Millero et al. |
| 7,354,650 | B2 | 4/2008 | Nakajima et al. |
| D568,344 | S | 5/2008 | Baacke et al. |
| 7,368,510 | B2 | 5/2008 | Lee et al. |
| 7,388,211 | B2 | 6/2008 | Chao et al. |
| 7,393,515 | B2 | 7/2008 | Hoshino et al. |
| 7,396,395 | B1 | 7/2008 | Chen et al. |
| 7,419,615 | B2 | 9/2008 | Strauss |
| 7,449,233 | B2 | 11/2008 | Arora |
| 7,459,197 | B2 | 12/2008 | Aizenberg et al. |
| 7,468,333 | B2 | 12/2008 | Kimbrell, Jr. et al. |
| 7,478,785 | B2 | 1/2009 | Herron, III et al. |
| 7,485,343 | B1 | 2/2009 | Branson et al. |
| 7,524,531 | B2 | 4/2009 | Axtell, III et al. |
| 7,527,832 | B2 | 5/2009 | Sakoske et al. |
| 7,544,411 | B2 | 6/2009 | Baumann et al. |
| D596,931 | S | 7/2009 | Fernandez |
| D596,932 | S | 7/2009 | Kleinsasser |
| 7,563,505 | B2 | 7/2009 | Reihs |
| 7,568,583 | B2 | 8/2009 | Wing et al. |
| 7,572,855 | B2 | 8/2009 | Fudemoto et al. |
| 7,582,214 | B2 | 9/2009 | Brook et al. |
| 7,607,744 | B2 | 10/2009 | Casoli et al. |
| D607,020 | S | 12/2009 | Baacke et al. |
| D612,404 | S | 3/2010 | Picken et al. |
| D612,405 | S | 3/2010 | Eicher |
| D613,316 | S | 4/2010 | Schmidt |
| 7,726,615 | B2 | 6/2010 | Rutz |
| 7,731,316 | B2 | 6/2010 | Wing |
| 7,748,806 | B2 | 7/2010 | Egan |
| 7,919,180 | B2 | 4/2011 | Furukawa |
| 7,943,234 | B2 | 5/2011 | Lawin et al. |
| 7,989,619 | B2 | 8/2011 | Guire et al. |
| 8,071,219 | B2* | 12/2011 | Berrux et al. .................. 428/446 |
| 8,192,994 | B2 | 6/2012 | Angros |
| 8,262,177 | B2 | 9/2012 | Picken et al. |
| 8,286,561 | B2* | 10/2012 | Driver et al. .................. 312/408 |
| 8,287,062 | B2 | 10/2012 | Nash et al. |
| 8,372,496 | B2* | 2/2013 | Le Bris et al. ............... 428/34.4 |
| 2001/0018130 | A1 | 8/2001 | Hayden |
| 2001/0019773 | A1 | 9/2001 | Akamatsu et al. |
| 2001/0024728 | A1 | 9/2001 | Kamitani et al. |
| 2001/0024805 | A1 | 9/2001 | Williams et al. |
| 2001/0030808 | A1 | 10/2001 | Komatsu et al. |
| 2001/0055677 | A1 | 12/2001 | Wuu |
| 2002/0001676 | A1 | 1/2002 | Hayden |
| 2002/0034627 | A1 | 3/2002 | Jacquiod et al. |
| 2002/0045007 | A1 | 4/2002 | Arora et al. |
| 2002/0077412 | A1 | 6/2002 | Kobayashi et al. |
| 2002/0111402 | A1 | 8/2002 | Mizuno et al. |
| 2002/0119595 | A1 | 8/2002 | Kim et al. |
| 2002/0177655 | A1 | 11/2002 | Pratt et al. |
| 2002/0192472 | A1 | 12/2002 | Metz et al. |
| 2002/0197490 | A1 | 12/2002 | Amidaiji et al. |
| 2003/0021902 | A1 | 1/2003 | Yamamoto et al. |
| 2003/0026972 | A1 | 2/2003 | Reihs |
| 2003/0040243 | A1* | 2/2003 | Ward ............................ 442/381 |
| 2003/0040568 | A1 | 2/2003 | Furuta et al. |
| 2003/0068481 | A1 | 4/2003 | Kody et al. |
| 2003/0070677 | A1 | 4/2003 | Handique et al. |
| 2003/0072723 | A1 | 4/2003 | Gers-Barlag et al. |
| 2003/0073067 | A1 | 4/2003 | Bookfinder et al. |
| 2003/0077533 | A1 | 4/2003 | Murota et al. |
| 2003/0091809 | A1 | 5/2003 | Scarborough et al. |
| 2003/0110976 | A1 | 6/2003 | Abidh et al. |
| 2003/0117051 | A1 | 6/2003 | Kweon |
| 2003/0119684 | A1 | 6/2003 | Tsao |
| 2003/0125656 | A1 | 7/2003 | Davankov et al. |
| 2003/0143339 | A1 | 7/2003 | Kobayashi |
| 2003/0149218 | A1 | 8/2003 | Cote' et al. |
| 2003/0162903 | A1 | 8/2003 | Day |
| 2003/0166840 | A1 | 9/2003 | Urry et al. |
| 2003/0170401 | A1 | 9/2003 | Shimomura et al. |
| 2003/0176572 | A1 | 9/2003 | Maekawa et al. |
| 2003/0179494 | A1 | 9/2003 | Kaneko |
| 2004/0005469 | A1 | 1/2004 | Metz et al. |
| 2004/0025747 | A1 | 2/2004 | Kamitani et al. |
| 2004/0050297 | A1 | 3/2004 | Kobayashi et al. |
| 2004/0053058 | A1 | 3/2004 | Kamitani et al. |
| 2004/0056575 | A1 | 3/2004 | Dietz et al. |
| 2004/0077738 | A1 | 4/2004 | Field et al. |
| 2004/0097616 | A1 | 5/2004 | Hoppler et al. |
| 2004/0102124 | A1 | 5/2004 | Suzuki |
| 2004/0121168 | A1 | 6/2004 | Goodwin et al. |
| 2004/0137814 | A1 | 7/2004 | Kimbrell et al. |
| 2004/0138083 | A1 | 7/2004 | Kimbrell et al. |
| 2004/0142557 | A1 | 7/2004 | Levy et al. |
| 2004/0142572 | A1 | 7/2004 | Deveau et al. |
| 2004/0154106 | A1 | 8/2004 | Oles et al. |
| 2004/0179973 | A1 | 9/2004 | Angros |
| 2004/0201048 | A1 | 10/2004 | Seki et al. |
| 2004/0209072 | A1* | 10/2004 | Henze et al. .................. 428/336 |
| 2004/0209203 | A1 | 10/2004 | Kano et al. |
| 2004/0213904 | A1 | 10/2004 | Muller et al. |
| 2004/0216227 | A1 | 11/2004 | Papadaki et al. |
| 2004/0245146 | A1 | 12/2004 | Kulp et al. |
| 2004/0247819 | A1 | 12/2004 | Khieu et al. |
| 2005/0000463 | A1 | 1/2005 | Mochizuki |
| 2005/0004264 | A1 | 1/2005 | Tanabe |
| 2005/0008859 | A1 | 1/2005 | Forgacs |
| 2005/0009953 | A1 | 1/2005 | Shea |
| 2005/0016828 | A1 | 1/2005 | Bednarek et al. |
| 2005/0022313 | A1 | 2/2005 | Scheidler |
| 2005/0031489 | A1 | 2/2005 | Angros |
| 2005/0053793 | A1 | 3/2005 | Benay-Oun et al. |
| 2005/0063876 | A1 | 3/2005 | Angros |
| 2005/0070026 | A1 | 3/2005 | Angros |
| 2005/0070424 | A1 | 3/2005 | Chiang et al. |
| 2005/0075020 | A1 | 4/2005 | Benayoun et al. |
| 2005/0106762 | A1 | 5/2005 | Chakrapani et al. |

(56) References Cited

U.S. PATENT DOCUMENTS

| | | |
|---|---|---|
| 2005/0121782 A1 | 6/2005 | Nakamura et al. |
| 2005/0143547 A1 | 6/2005 | Stark et al. |
| 2005/0165194 A1 | 7/2005 | Benayoun et al. |
| 2005/0170098 A1 | 8/2005 | Baumann et al. |
| 2005/0181195 A1 | 8/2005 | Dubrow |
| 2005/0211405 A1 | 9/2005 | Yeh |
| 2005/0221098 A1 | 10/2005 | Azzopardi et al. |
| 2005/0239211 A1 | 10/2005 | Uchihara et al. |
| 2005/0245395 A1 | 11/2005 | Tanaka et al. |
| 2006/0013983 A1 | 1/2006 | Sebastian et al. |
| 2006/0029808 A1 | 2/2006 | Zhai et al. |
| 2006/0040164 A1 | 2/2006 | Vyas et al. |
| 2006/0051561 A1 | 3/2006 | Badyal |
| 2006/0052556 A1 | 3/2006 | Franchina et al. |
| 2006/0057390 A1 | 3/2006 | Kittle et al. |
| 2006/0062695 A1 | 3/2006 | Haab et al. |
| 2006/0062929 A1 | 3/2006 | Kittle et al. |
| 2006/0081394 A1 | 4/2006 | Li et al. |
| 2006/0089466 A1 | 4/2006 | Shimomura et al. |
| 2006/0099397 A1 | 5/2006 | Thierauf et al. |
| 2006/0110541 A1 | 5/2006 | Russell et al. |
| 2006/0110542 A1 | 5/2006 | Dietz et al. |
| 2006/0113443 A1 | 6/2006 | Remmers |
| 2006/0147634 A1 | 7/2006 | Strauss |
| 2006/0151739 A1 | 7/2006 | Sandner et al. |
| 2006/0154048 A1 | 7/2006 | Teranishi et al. |
| 2006/0160984 A1 | 7/2006 | Nagasawa et al. |
| 2006/0162373 A1 | 7/2006 | McMillin et al. |
| 2006/0172641 A1 | 8/2006 | Hennige et al. |
| 2006/0185555 A1 | 8/2006 | Giessler et al. |
| 2006/0207032 A1 | 9/2006 | Reiners et al. |
| 2006/0213849 A1 | 9/2006 | Bienick |
| 2006/0222865 A1 | 10/2006 | Hoshino et al. |
| 2006/0244034 A1 | 11/2006 | Sakurai et al. |
| 2006/0263516 A1 | 11/2006 | Jones et al. |
| 2006/0266258 A1 | 11/2006 | Asakura et al. |
| 2006/0269758 A1 | 11/2006 | Helmeke |
| 2006/0281889 A1 | 12/2006 | Kobayashi et al. |
| 2006/0286305 A1 | 12/2006 | Thies et al. |
| 2006/0292345 A1 | 12/2006 | Dave et al. |
| 2007/0003705 A1 | 1/2007 | Strauss |
| 2007/0005024 A1 | 1/2007 | Weber et al. |
| 2007/0009657 A1 | 1/2007 | Zhang et al. |
| 2007/0014970 A1 | 1/2007 | Nun et al. |
| 2007/0026193 A1 | 2/2007 | Luzinov et al. |
| 2007/0028625 A1 | 2/2007 | Joshi et al. |
| 2007/0046160 A1 | 3/2007 | Egan |
| 2007/0065668 A1 | 3/2007 | Idei |
| 2007/0075199 A1 | 4/2007 | Stewart et al. |
| 2007/0141306 A1 | 6/2007 | Kasai et al. |
| 2007/0148407 A1 | 6/2007 | Chen et al. |
| 2007/0166513 A1 | 7/2007 | Sheng et al. |
| 2007/0172650 A1 | 7/2007 | O'Rear et al. |
| 2007/0172658 A1 | 7/2007 | Deruelle et al. |
| 2007/0172661 A1 | 7/2007 | Fechner et al. |
| 2007/0176379 A1 | 8/2007 | Sonnendorfer et al. |
| 2007/0196656 A1 | 8/2007 | Rowell |
| 2007/0202342 A1 | 8/2007 | Whiteford et al. |
| 2007/0213230 A1 | 9/2007 | Pfeiffer et al. |
| 2007/0215004 A1 | 9/2007 | Kuroda et al. |
| 2007/0218265 A1 | 9/2007 | Harris et al. |
| 2007/0224898 A1 | 9/2007 | Deangelis et al. |
| 2007/0231517 A1 | 10/2007 | Golownia |
| 2007/0237947 A1 | 10/2007 | Gleason et al. |
| 2007/0238807 A1 | 10/2007 | Safir et al. |
| 2007/0259156 A1 | 11/2007 | Kempers et al. |
| 2007/0274871 A1 | 11/2007 | Jiang |
| 2007/0298216 A1 | 12/2007 | Jing et al. |
| 2008/0012459 A1 | 1/2008 | Picken et al. |
| 2008/0018709 A1 | 1/2008 | Takenaka et al. |
| 2008/0020127 A1 | 1/2008 | Whiteford et al. |
| 2008/0021212 A1 | 1/2008 | Whiteford et al. |
| 2008/0032403 A1 | 2/2008 | Saito et al. |
| 2008/0039558 A1 | 2/2008 | Lazzari et al. |
| 2008/0044635 A1 | 2/2008 | O'Neill et al. |
| 2008/0050567 A1 | 2/2008 | Kawashima et al. |
| 2008/0063870 A1 | 3/2008 | O'Rear et al. |
| 2008/0066648 A1 | 3/2008 | Asakura et al. |
| 2008/0070146 A1 | 3/2008 | Fomitchev et al. |
| 2008/0073505 A1 | 3/2008 | Niu et al. |
| 2008/0076005 A1 | 3/2008 | Levesque et al. |
| 2008/0088192 A1 | 4/2008 | Hsu |
| 2008/0090004 A1 | 4/2008 | Zhang et al. |
| 2008/0101041 A1 | 5/2008 | Chang et al. |
| 2008/0102347 A1 | 5/2008 | Blunk |
| 2008/0107864 A1 | 5/2008 | Zhang et al. |
| 2008/0131653 A1 | 6/2008 | Lyons et al. |
| 2008/0160257 A1 | 7/2008 | Takada et al. |
| 2008/0166549 A1 | 7/2008 | Shieh et al. |
| 2008/0171805 A1 | 7/2008 | Mingarelli et al. |
| 2008/0172937 A1 | 7/2008 | Palmer et al. |
| 2008/0176991 A1 | 7/2008 | Osawa et al. |
| 2008/0197760 A1 | 8/2008 | Leconte et al. |
| 2008/0199657 A1 | 8/2008 | Capron et al. |
| 2008/0199659 A1 | 8/2008 | Zhao |
| 2008/0205950 A1 | 8/2008 | Moorlag et al. |
| 2008/0206550 A1 | 8/2008 | Borlner |
| 2008/0207581 A1 | 8/2008 | Whiteford et al. |
| 2008/0213601 A1 | 9/2008 | Yamamoto et al. |
| 2008/0220170 A1 | 9/2008 | Van Der Flaas |
| 2008/0220676 A1 | 9/2008 | Marin et al. |
| 2008/0221009 A1 | 9/2008 | Kanagasabapathy et al. |
| 2008/0221263 A1 | 9/2008 | Kanagasabapathy et al. |
| 2008/0226694 A1 | 9/2008 | Gelbart et al. |
| 2008/0233355 A1* | 9/2008 | Henze et al. ............... 428/168 |
| 2008/0237126 A1 | 10/2008 | Hoek et al. |
| 2008/0241512 A1 | 10/2008 | Boris et al. |
| 2008/0241523 A1 | 10/2008 | Huignard et al. |
| 2008/0245273 A1 | 10/2008 | Vyorkka et al. |
| 2008/0246804 A1 | 10/2008 | Kawase et al. |
| 2008/0248263 A1 | 10/2008 | Kobrin |
| 2008/0250978 A1 | 10/2008 | Baumgart et al. |
| 2008/0261024 A1 | 10/2008 | Xenopoulos et al. |
| 2008/0268233 A1 | 10/2008 | Lawin et al. |
| 2008/0269358 A1 | 10/2008 | Inoue et al. |
| 2008/0280148 A1 | 11/2008 | Nun et al. |
| 2008/0280699 A1 | 11/2008 | Jarvholm |
| 2008/0286556 A1 | 11/2008 | D'urso et al. |
| 2008/0295347 A1 | 12/2008 | Braham |
| 2008/0296252 A1 | 12/2008 | D'Urso et al. |
| 2008/0299288 A1 | 12/2008 | Kobrin et al. |
| 2008/0306202 A1 | 12/2008 | Lin et al. |
| 2008/0310660 A1 | 12/2008 | Lin |
| 2009/0010870 A1 | 1/2009 | Greiner et al. |
| 2009/0011222 A1 | 1/2009 | Xiu et al. |
| 2009/0011227 A1 | 1/2009 | Furukawa |
| 2009/0011960 A1 | 1/2009 | Wu |
| 2009/0018249 A1 | 1/2009 | Kanagasabapathy et al. |
| 2009/0025508 A1 | 1/2009 | Liao et al. |
| 2009/0025609 A1 | 1/2009 | Egami et al. |
| 2009/0032088 A1 | 2/2009 | Rabinowitz |
| 2009/0036978 A1 | 2/2009 | Kleiner et al. |
| 2009/0042469 A1 | 2/2009 | Simpson |
| 2009/0058247 A1 | 3/2009 | Collins et al. |
| 2009/0064894 A1 | 3/2009 | Baumgart et al. |
| 2009/0076430 A1 | 3/2009 | Simpson et al. |
| 2009/0084914 A1 | 4/2009 | Picken et al. |
| 2009/0085453 A1 | 4/2009 | Daley et al. |
| 2009/0087670 A1 | 4/2009 | Peng et al. |
| 2009/0095941 A1 | 4/2009 | Nakata et al. |
| 2009/0099301 A1 | 4/2009 | Naraghi et al. |
| 2009/0105409 A1 | 4/2009 | Munzmay et al. |
| 2009/0105679 A1 | 4/2009 | Joubert et al. |
| 2009/0111344 A1 | 4/2009 | Murphy et al. |
| 2009/0115302 A1 | 5/2009 | Benz et al. |
| 2009/0123659 A1 | 5/2009 | Oles et al. |
| 2009/0134758 A1 | 5/2009 | Vardon |
| 2009/0136737 A1 | 5/2009 | Ring et al. |
| 2009/0142604 A1 | 6/2009 | Imai et al. |
| 2009/0155566 A1 | 6/2009 | Gentleman et al. |
| 2009/0162592 A1 | 6/2009 | Baikerikar et al. |
| 2009/0163637 A1 | 6/2009 | Li et al. |
| 2009/0167182 A1 | 7/2009 | Frick |
| 2009/0181237 A1 | 7/2009 | Kaiser et al. |

(56) References Cited

U.S. PATENT DOCUMENTS

| | | | |
|---|---|---|---|
| 2009/0182085 A1 | 7/2009 | Escobar Barrios et al. |
| 2009/0186070 A1 | 7/2009 | Guire et al. |
| 2009/0188877 A1 | 7/2009 | Stewart |
| 2009/0195136 A1 | 8/2009 | Wing et al. |
| 2009/0196990 A1 | 8/2009 | Simpson et al. |
| 2009/0212505 A1 | 8/2009 | McMillin et al. |
| 2009/0227164 A1 | 9/2009 | Broch-Nielsen et al. |
| 2009/0236091 A1 | 9/2009 | Hammami et al. |
| 2009/0246473 A1 | 10/2009 | Lee et al. |
| 2009/0298369 A1 | 12/2009 | Koene et al. |
| 2010/0001625 A1 | 1/2010 | Eckartsberg et al. |
| 2010/0003493 A1 | 1/2010 | Cheng et al. |
| 2010/0026156 A1 | 2/2010 | Leconte et al. |
| 2010/0052491 A1 | 3/2010 | Vardon |
| 2010/0102693 A1* | 4/2010 | Driver et al. ............... 312/408 |
| 2010/0109498 A1 | 5/2010 | Ramm et al. |
| 2010/0117502 A1 | 5/2010 | Kang et al. |
| 2010/0133970 A1 | 6/2010 | Shin et al. |
| 2010/0176703 A1 | 7/2010 | Kim |
| 2010/0181884 A1 | 7/2010 | De La Garza et al. |
| 2010/0196702 A9 | 8/2010 | Furukawa |
| 2010/0213334 A1 | 8/2010 | Davenport |
| 2010/0294721 A1 | 11/2010 | Frazier et al. |
| 2010/0330347 A1 | 12/2010 | Badyal et al. |
| 2011/0164399 A1 | 7/2011 | Driver et al. |
| 2011/0268973 A1 | 11/2011 | Guire et al. |
| 2012/0104924 A1 | 5/2012 | Nash et al. |
| 2012/0104925 A1 | 5/2012 | Nash et al. |
| 2012/0216880 A1 | 8/2012 | Nall et al. |
| 2012/0234113 A1 | 9/2012 | Angros |
| 2013/0037505 A1 | 2/2013 | Driver et al. |

FOREIGN PATENT DOCUMENTS

| | | |
|---|---|---|
| CN | 2113879 U | 8/1992 |
| CN | 2313146 | 4/1999 |
| CN | 1566891 A | 1/2005 |
| CN | 101046271 A | 10/2007 |
| CN | 101255549 | 9/2008 |
| CN | 101311238 | 11/2008 |
| EP | 0 207 282 | 1/1987 |
| EP | 0 294 906 | 12/1988 |
| EP | 0 307 915 | 3/1989 |
| EP | 0 317 057 | 5/1989 |
| EP | 0 332 141 | 9/1989 |
| EP | 0 399 568 | 11/1990 |
| EP | 0 405 317 | 1/1991 |
| EP | 0 452 723 | 10/1991 |
| EP | 0 472 215 | 2/1992 |
| EP | 0 493 270 | 7/1992 |
| EP | 0 535 451 | 4/1993 |
| EP | 0 437 268 | 1/1994 |
| EP | 0 623 656 | 11/1994 |
| EP | 0 624 404 | 11/1994 |
| EP | 0 649 887 | 4/1995 |
| EP | 0 657 393 | 6/1995 |
| EP | 0 657 939 | 6/1995 |
| EP | 0 669 871 | 9/1995 |
| EP | 0 714 870 | 6/1996 |
| EP | 0 714 921 | 6/1996 |
| EP | 0 719 743 | 7/1996 |
| EP | 0 719 821 | 7/1996 |
| EP | 0 738 309 | 10/1996 |
| EP | 0 739 714 | 10/1996 |
| EP | 0 745 567 | 12/1996 |
| EP | 0 745 568 | 12/1996 |
| EP | 0 752 459 | 1/1997 |
| EP | 0 770 706 | 5/1997 |
| EP | 0 799 791 | 10/1997 |
| EP | 0 811 430 | 12/1997 |
| EP | 0 863 191 | 9/1998 |
| EP | 0 867 048 | 9/1998 |
| EP | 0 903 389 | 3/1999 |
| EP | 0 904 343 | 3/1999 |
| EP | 0 914 873 | 5/1999 |
| EP | 0 915 103 | 5/1999 |
| EP | 0 930 351 | 7/1999 |
| EP | 0 969 718 | 1/2000 |
| EP | 1 047 735 | 11/2000 |
| EP | 1 048 696 | 11/2000 |
| EP | 1 072 572 | 1/2001 |
| EP | 1 095 923 | 5/2001 |
| EP | 1 097 979 | 5/2001 |
| EP | 1 108 735 | 6/2001 |
| EP | 1 113 064 | 7/2001 |
| EP | 1 136 539 | 9/2001 |
| EP | 1 180 533 | 2/2002 |
| EP | 1 187 872 | 3/2002 |
| EP | 1 193 289 | 4/2002 |
| EP | 1 204 617 | 5/2002 |
| EP | 1 215 252 | 6/2002 |
| EP | 1 261 559 | 12/2002 |
| EP | 1 333 053 | 8/2003 |
| EP | 1 360 253 | 11/2003 |
| EP | 1 362 904 | 11/2003 |
| EP | 1 387 011 | 2/2004 |
| EP | 1 387 169 | 2/2004 |
| EP | 1 392 619 | 3/2004 |
| EP | 1 392 772 | 3/2004 |
| EP | 1 401 903 | 3/2004 |
| EP | 1 407 792 | 4/2004 |
| EP | 1 429 919 | 6/2004 |
| EP | 1 431 126 | 6/2004 |
| EP | 1 433 821 | 6/2004 |
| EP | 1 449 582 | 8/2004 |
| EP | 1 473 355 | 11/2004 |
| EP | 1 475 234 | 11/2004 |
| EP | 1 479 738 | 11/2004 |
| EP | 1 492 837 | 1/2005 |
| EP | 1 503 813 | 2/2005 |
| EP | 1 524 290 | 4/2005 |
| EP | 1 583 615 | 10/2005 |
| EP | 1 752 284 | 2/2007 |
| EP | 1 772 479 | 4/2007 |
| EP | 1 787 716 | 5/2007 |
| EP | 1 857 497 | 11/2007 |
| EP | 1 873 218 | 1/2008 |
| EP | 1 875 279 | 1/2008 |
| EP | 1 883 669 | 2/2008 |
| EP | 1 902 091 | 3/2008 |
| EP | 1 908 804 | 4/2008 |
| EP | 1 988 129 | 11/2008 |
| EP | 1 997 619 | 12/2008 |
| EP | 2 030 779 | 3/2009 |
| EP | 1 503 718 | 7/2009 |
| GB | 1 341 605 | 12/1973 |
| JP | 54031585 | 3/1979 |
| JP | 56122815 | 9/1981 |
| JP | 57053535 | 3/1982 |
| JP | 61250010 | 11/1986 |
| JP | 62215610 | 9/1987 |
| JP | 62-246960 | 10/1987 |
| JP | 1005884 | 1/1989 |
| JP | 08007650 | 1/1996 |
| JP | 08104370 | 4/1996 |
| JP | 08130268 | 5/1996 |
| JP | 08151280 | 6/1996 |
| JP | 2002283511 | 10/2002 |
| JP | 2002284907 | 10/2002 |
| JP | 2002363424 | 12/2002 |
| JP | 2004130785 | 4/2004 |
| JP | 2004219534 | 8/2004 |
| JP | 2004308984 | 11/2004 |
| JP | 2004308984 A * | 11/2004 |
| JP | 2005126605 | 5/2005 |
| JP | 2007070411 | 3/2007 |
| JP | 2007182491 | 7/2007 |
| JP | 2008228958 | 10/2008 |
| JP | 2009071672 | 4/2009 |
| KR | 10-2003-0052853 | 6/2003 |
| MX | 175646 | 8/1994 |
| MX | 183533 | 12/1996 |
| MX | 192053 | 5/1999 |

(56) References Cited

FOREIGN PATENT DOCUMENTS

| | | |
|---|---|---|
| MX | 195031 | 1/2000 |
| MX | 199899 | 11/2000 |
| MX | 201072 | 3/2001 |
| MX | 203880 | 8/2001 |
| MX | 205074 | 11/2001 |
| MX | PA01011653 | 12/2002 |
| MX | 215752 | 8/2003 |
| MX | PA02006399 | 9/2003 |
| MX | PA05006898 | 8/2005 |
| MX | PA02012841 | 1/2006 |
| MX | 234477 | 2/2006 |
| MX | PA06003323 | 3/2006 |
| SU | 1288191 | 2/1987 |
| TW | I252213 | 4/2006 |
| TW | I263619 B | 10/2006 |
| WO | WO-88/01286 | 2/1988 |
| WO | WO-91/04305 | 4/1991 |
| WO | WO-93/16131 | 8/1993 |
| WO | WO-93/20165 | 10/1993 |
| WO | WO-94/13734 | 6/1994 |
| WO | WO-96/04123 | 2/1996 |
| WO | WO-96/07621 | 3/1996 |
| WO | WO-96/31771 | 10/1996 |
| WO | WO-97/07993 | 3/1997 |
| WO | WO-98/20960 | 5/1998 |
| WO | WO-99/23137 | 5/1999 |
| WO | WO-99/23437 | 5/1999 |
| WO | WO-99/40431 | 8/1999 |
| WO | WO-99/47578 | 9/1999 |
| WO | WO-99/48339 A1 | 9/1999 |
| WO | WO-99/57185 | 11/1999 |
| WO | WO-99/64363 | 12/1999 |
| WO | WO-00/05321 | 2/2000 |
| WO | WO-00/14297 | 3/2000 |
| WO | WO-00/25938 | 5/2000 |
| WO | WO-00/34361 | 6/2000 |
| WO | WO-00/39240 | 7/2000 |
| WO | WO-00/46464 | 8/2000 |
| WO | WO-00/66241 | 11/2000 |
| WO | WO-01/12317 | 2/2001 |
| WO | WO-01/19745 | 3/2001 |
| WO | WO-01/62682 | 8/2001 |
| WO | WO-01/74739 | 10/2001 |
| WO | WO-01/79142 | 10/2001 |
| WO | WO-01/79371 | 10/2001 |
| WO | WO-01/98399 | 12/2001 |
| WO | WO-02/14417 | 2/2002 |
| WO | WO-02/20259 | 3/2002 |
| WO | WO-02/28951 | 4/2002 |
| WO | WO-02/43937 | 6/2002 |
| WO | WO-02/47187 | 6/2002 |
| WO | WO-02/062910 | 8/2002 |
| WO | WO-02/074869 | 9/2002 |
| WO | WO-02/096831 | 12/2002 |
| WO | WO-02/098983 | 12/2002 |
| WO | WO-03/010255 | 2/2003 |
| WO | WO-03/012004 | 2/2003 |
| WO | WO-03/030879 | 4/2003 |
| WO | WO-03/037702 | 5/2003 |
| WO | WO-03/045693 | 6/2003 |
| WO | WO-03/064025 | 8/2003 |
| WO | WO-03/080258 | 10/2003 |
| WO | WO-03/082998 | 10/2003 |
| WO | WO-03/092748 | 11/2003 |
| WO | WO-03/093568 | 11/2003 |
| WO | WO-2004/012625 | 2/2004 |
| WO | WO-2004/043319 | 5/2004 |
| WO | WO-2004/058418 | 7/2004 |
| WO | WO-2004/072556 | 8/2004 |
| WO | WO-2004/076154 | 9/2004 |
| WO | WO-2004/104116 | 12/2004 |
| WO | WO-2004/110132 | 12/2004 |
| WO | WO-2005005679 | 1/2005 |
| WO | WO-2005/021843 | 3/2005 |
| WO | WO-2005/023935 | 3/2005 |
| WO | WO-2005/028562 | 3/2005 |
| WO | WO-2005/068399 | 7/2005 |
| WO | WO-2005/077429 | 8/2005 |
| WO | WO-2005081722 | 9/2005 |
| WO | WO-2006/044641 | 4/2006 |
| WO | WO-2006/044642 | 4/2006 |
| WO | WO-2006/081891 | 8/2006 |
| WO | WO-2006/083600 | 8/2006 |
| WO | WO-2006/091235 | 8/2006 |
| WO | WO-2006/101934 | 9/2006 |
| WO | WO-2006121534 | 11/2006 |
| WO | WO-2006/135755 | 12/2006 |
| WO | WO-2007/011731 | 1/2007 |
| WO | WO-2007007995 | 1/2007 |
| WO | WO-2007/027276 | 3/2007 |
| WO | WO-2007/052260 | 5/2007 |
| WO | WO-2007/053266 | 5/2007 |
| WO | WO-2007/056427 | 5/2007 |
| WO | WO-2007/070801 | 6/2007 |
| WO | WO-2007/075407 | 7/2007 |
| WO | WO-2007075390 | 7/2007 |
| WO | WO-2007/092746 | 8/2007 |
| WO | WO-2007/102960 | 9/2007 |
| WO | WO-2007/104494 | 9/2007 |
| WO | WO-2007/126432 | 11/2007 |
| WO | WO-2007/126743 | 11/2007 |
| WO | WO-2007/130294 | 11/2007 |
| WO | WO-2007/149617 | 12/2007 |
| WO | WO-2008/004828 | 1/2008 |
| WO | WO-2008/006078 | 1/2008 |
| WO | WO-2008/021791 | 2/2008 |
| WO | WO-2008/035347 | 3/2008 |
| WO | WO-2008/035917 | 3/2008 |
| WO | WO-2008045022 | 4/2008 |
| WO | WO-2008048498 | 4/2008 |
| WO | WO-2008/050895 | 5/2008 |
| WO | WO-2008/051221 | 5/2008 |
| WO | WO-2008/066828 | 6/2008 |
| WO | WO-2008071983 | 6/2008 |
| WO | WO-2008/078346 | 7/2008 |
| WO | WO-2008088116 | 7/2008 |
| WO | WO-2008/106494 | 9/2008 |
| WO | WO-2008/112158 | 9/2008 |
| WO | WO-2008/123650 | 10/2008 |
| WO | WO-2008/123955 | 10/2008 |
| WO | WO-2008/123961 | 10/2008 |
| WO | WO-2008/134243 | 11/2008 |
| WO | WO-2008/137973 | 11/2008 |
| WO | WO-2008/141971 | 11/2008 |
| WO | WO-2008/151991 | 12/2008 |
| WO | WO-2008/153687 | 12/2008 |
| WO | WO-2009/003847 | 1/2009 |
| WO | WO-2009/005465 | 1/2009 |
| WO | WO-2009/012116 | 1/2009 |
| WO | WO-2009/018327 | 2/2009 |
| WO | WO-2009/028745 | 3/2009 |
| WO | WO-2009/037717 | 3/2009 |
| WO | WO-2009/041752 | 4/2009 |
| WO | WO-2009/061199 | 5/2009 |
| WO | WO-2009073901 | 6/2009 |
| WO | WO-2009/148611 | 12/2009 |
| WO | WO-2009/158567 | 12/2009 |
| WO | WO-2010/042191 | 4/2010 |
| WO | WO-2010/042668 | 4/2010 |
| WO | WO-2012/115986 A1 | 8/2012 |
| WO | WO 2012115986 A1 * | 8/2012 |

OTHER PUBLICATIONS

"Hydrophobicity, hydrophilicity and silane surface modification", Gelest, Inc. product catalog (2011).
"Silicone Resin Applications", product manual by VERTEC (now Johnson Matthey Catalysts) (available prior to Nov. 2, 2009).
Burkarter et al., Superhydrophobic electrosprayed PTFE, Surface & Coatings Technology, 202:194-8 (2007).
Chuppina et al., Synthesis of sodium-chromium pyrophosphate as a pigment for organosilicate hydrophobic heat-resistant coating, Seventh Russian-Israeli Bi-National Workshop 2008 (4 pages).

(56) References Cited

OTHER PUBLICATIONS

Declaration of Chris B. Schechter filed before the Patent and Trial Board on Jun. 14, 2013.
Du, Surfactants, Dispersants, and Defoamers for the Coatings, Inks, and Adhesives Industries, p. 7, IN: Tracton (ed.): Coatings Technology Handbook, 3rd edition, Taylor & Francis Group (2005).
Elkin et al., Wettability, chemical and morphological data of hydrophobic layers by plasma polymerization on smooth substrates, Surface and Coatings Technology, 116-9: 836-40 (1999).
EPO Communication regarding third-party observations in corresponding European application No. 09771098.2 (Dec. 5, 2011).
European Examination Report for Application No. 10776886.3, dated May 8, 2013.
Extended European search report from corresponding European application No. 09771098.2, dated Dec. 27, 2011.
Feng et al., Fabrication of superhydrophobic and heat-insulating antimony doped tin oxide/polyurethane films by cast replica micromolding, J. Colloid Interface Sci., 336(1):268-72 (2009).
Final Office Action for U.S. Appl. No. 13/651,842 dated Apr. 8, 2013.
Final Office Action, U.S. Appl. No. 12/835,913, Badyal et al. Oct. 23, 2012.
First Office Action from the State Intellectual Property Office of P.R. China from counterpart application CN200980124417.6 (Mar. 1, 2012) (English and Chinese).
Gilath, Water repellent coating for welding electrodes based on sol-gel technology, J. Sol-Gel Sci. Technol., 10:101-4 (1997).
Guilman, Limit the messes with the spillproof slideout shelf in the GE Profile refrigerators Nov. 13, 2008.
International Preliminary Report on Patentability for corresponding international application No. PCT/US2009/048775, dated Jan. 13, 2011.
International Search Report and Written Opinion for International Application No. PCT/US2010/048711, dated Mar. 17, 2011.
International Search Report and Written Opinion from corresponding International Application No. PCT/US2009/048775, dated Nov. 19, 2009.
International Search Report and Written Opinion from International Application No. PCT/US2010/054936, dated Feb. 16, 2011.
Kobayashi et al., Surface Tension of Poly[(3,3,4,4,5,5,6,6,6-nonafluorohexyl)-methylsiloxane], *Marcomolecules*, 23:4929-4933 (1990).
Le Marechal et al., Textile Finishing Industry as an Important Source of Organic Pollutants, IN: Puzyn (ed.), Organic Pollutants Ten Years After the Stockholm Convention—Environmental and Analytical Update, In Tech (2012).
Lee et al., Surface modification of high heat resistant UV cured polyurethane dispersions, European Polymer J., 43(10):4271-8 (2007).
Liu et al., Can superhydrophobic surfaces repel hot water? J. Mater. Chem., 19:5602 (2009).
Mayer, The chemistry and properties of silicone resins, Surface Coatings Intl., 82(2):77-83 (1999).
Mayer, The chemistry and properties of silicone resins: network formers (in paints and renders), Pigment & Resin Technology, 27(6):364-73 (1998).
Ming et al., Toward Superlyophobic Surfaces, p. 200 IN: Mittal (ed.), Contact Angle, Wettability and Adhesion, vol. 6 (2006).
NeverWet coatings are superhydrophobic surfaces, downloaded from the Internet at: <http://www.neverwet.com/product-characteristics.php> (Mar. 7, 2013).
Nonfinal Office Action from U.S. Appl. No. 13/082,319 (Apr. 3, 2013).
Nonfinal Office Action, U.S. Appl. No. 13/000,487 Sep. 6, 2012.
Nonfinal Office Action, U.S. Appl. No. 13/082,327, Bleecher et al. Dec. 21, 2012.
Office Action for U.S. Appl. No. 13/651,842 dated Jan. 10, 2013.
Office action for U.S. Appl. No. 12/562,920 dated Mar. 29, 2012.
Petition for Inter Partes Review of U.S. Patent No. 8,286,561 under 35 U.S.C. §§ 311-319 and 37 C.F.R. § 42.100 et seq., filed before the Patent and Trial Board on Jun. 14, 2013.

Power of Attorney pursuant to 37 C.F.R. § 42.10(b) filed before the Patent and Trial Board on Jun. 14, 2013.
Prosecution history of European application No. EP06787306.7 (published as EP1902091) as of Sep. 3, 2009.
Researchers develop ultra-thin heat protective coatings for rockets, insulating coatings for microelectronics (Aug. 27, 2001).
Shilova et al., The influence of low- and high-molecular Hydroxyl-Containing Additives on the Stability of Sol-Gel Tetraethoxysilane-Based Systems and on the Structure of Hybrid Organic-Inorganic Coatings, Glass Physics and Chemistry, 29(4): 379-89 (2003).
Supplementary European Search Report, European Application No. 09771098 Completed date Dec. 9, 2011.
Third party opposition filed in corresponding European applicaton No. 09771098.2 (Dec. 5, 2011).
Uneiko Corporation, Rain Clear available at <http://web.archive.org/web/20070706032331/http:/www.rainclear.com/> (archived Jul. 6, 2007).
Uyanik et al., Heat-resistant hydrophobic-oleophobic coatings, J. Appl. Polymer Sci., 100(3):2386-92 (2006).
Van der Wal et al., Soft Matter, 3:426 (2009).
Wang et al., Fabrication and anti-frosting performance of super hydrophobic coating based on modified nano-sized calcium carbonate and ordinary polyacrylate, Appl. Surface Sci., 253(22):8818-24 (2007).
What's Hot in Beverage Centers, Kitchen & Bath Business, vol. 56, No. 7, pp. 20-21, Aug. 2009.
Witucki, The evoluation of silicon-based technology in coatings, Dow Corning Corporation (2003).
Wolf, "Haier Heralds 08 Applicance Line in NYC" Dec. 3, 2007.
Zhang et al., Surface properties and gas permeability of Polybutadiene membrane treated with various fluorine containing gas plasmas, sen'i Gakkaishi, 47(12):635-43 ( 991).
2009 R&D 100 Award Entry Form (p. 5 excerpt from another document) showing Fig. 1 Schematic of NICE ("no ice nanocoating") (2009).
Bayer Materials Science product information on Bayhydrol® 110 polyurethane dispersion (two first pages of this brochure) (Aug. 2002).
Bayer Materials Science product information on Bayhydrol® 122 polyurethane dispersion (Jan. 2004).
Bayer Materials Science product information on Bayhydrol® 124 polyurethane dispersion (Jan. 2004).
Bayer Materials Science product information on Bayhydrol® 140AQ polyurethane dispersion (Aug. 2002).
Bayer Materials Science product information on Bayhydrol® A145, aqueous hydroxyl-functional polyurethane dispersion (Jan. 2010).
Clark et al., Paints and Pigments, dowloaded from the Internet at: <http://nzic.org.nz/ChemProcesses/polymers/10D.pdf> (copyright Aug. 2005).
International Preliminary Report on Patentability, PCT/US2010/059909, Jul. 4, 2012.
International Search Report and Written Opinion, PCT/US2009/005512, mailing date Dec. 8, 2009.
International Search Report and Written Opinion, PCT/US2010/059909, mailing date Feb. 9, 2011.
International Search Report and Written Opinion, PCT/US2012/025982, mailing date Jun. 13, 2012.
Sherwin-Williams Chemical Coatings product information for CC-E14, POLANE® 700T, water reducible enamel (May 2010).
Two webpages re pigment particle size downloaded from the Internet at: <http://www.specialchem4coatings.com/tc/tio2/index.aspx?id=whiteness>, SpecialChem S.A. (printed on Sep. 3, 2013).
Nonfinal office action, U.S. Appl. No. 12/835,913, mail date Jun. 14, 2013.
Final Office Action, U.S. Appl. No. 13/082,327, Sep. 23, 2013.
"Composition", in Collins English Dictionary (2000), viewed Aug. 26, 2013 from <http://www.credoreferences.com/entry/hcengdict/composition>.
Decision, Institution of Inter Partes Review 37 C.F.R. § 42.108, *Schott Gemtron Corp. v. SSW Holding Co., Inc.*, Case IPR2013-00358, Paper No. 14, Nov. 4, 2013, 20 pages.

(56) References Cited

OTHER PUBLICATIONS

First Office Action, Chinese patent application No. 201080036561.7, dated Nov. 28, 2013 [in Chinese with English translation].
Trial No. IPR2013-00358, in re Inter Partes Review of United States Patent No. 8,286,561, Final Written Opinion (Aug. 20, 2014).
Nonfinal office action, U.S. Appl. No. 13/082,319, mailed Sep. 22, 2014.
Nonfinal office action, U.S. Appl. No. 13/082,327, mailed Sep. 19, 2014.
Examination Report, European patent application No. 10776886.3, dated Mar. 11, 2015.

* cited by examiner

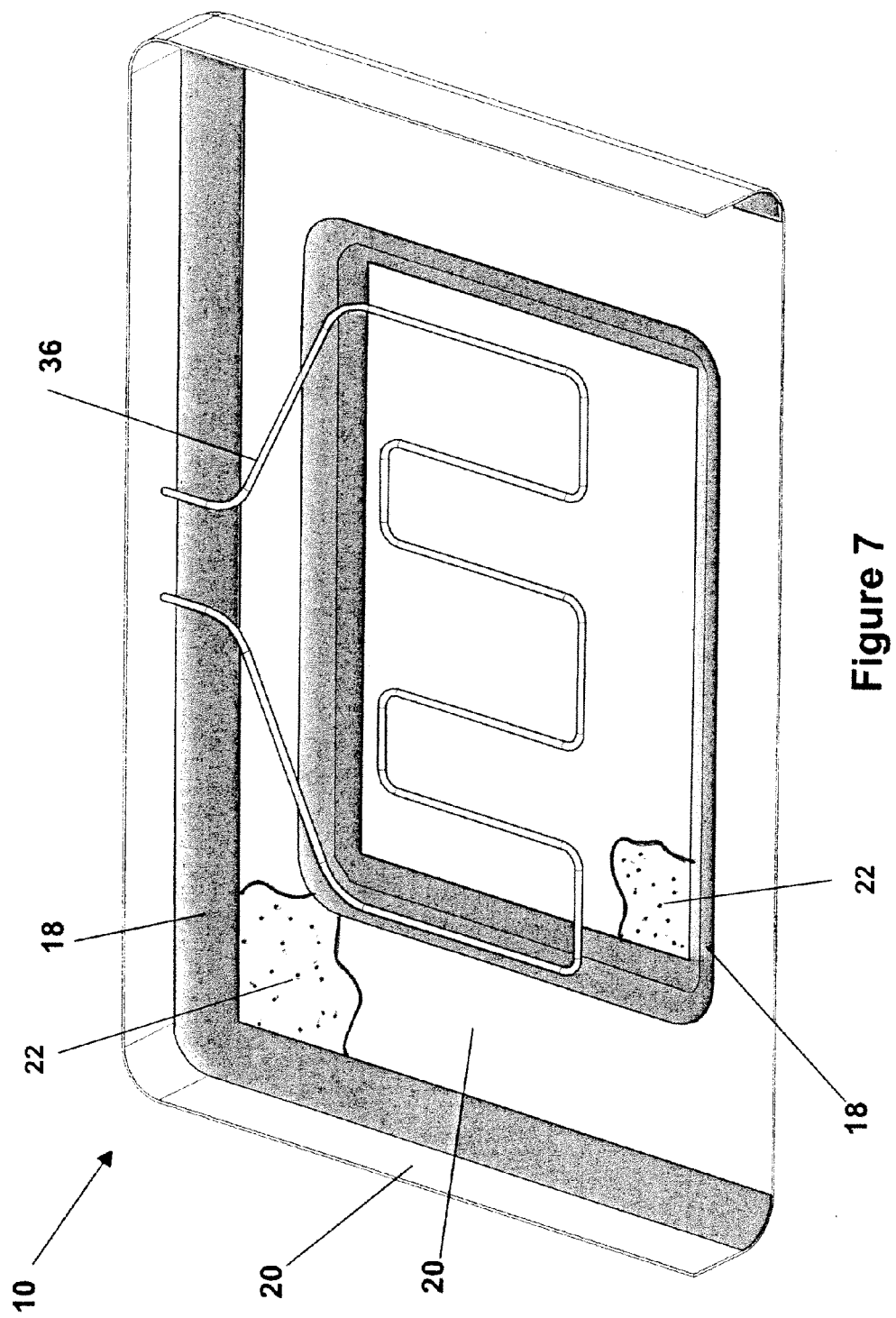

COOKING APPLIANCE SURFACES HAVING SPILL CONTAINMENT PATTERN

CROSS-REFERENCE TO RELATED APPLICATION

This is the U.S. national phase of International Application No. PCT/US2010/054936 filed Nov. 1, 2010, which claims the benefit of U.S. Patent Application Ser. No. 61/258,124 filed Nov. 4, 2009, the entire disclosures of which are hereby incorporated herein by reference.

FIELD OF THE DISCLOSURE

The disclosure relates to appliances for cooking and baking, which have a spill containment pattern disposed thereon, and methods of making the same. More particularly, the disclosure is directed to a cooking appliance or cooking appliance surface that includes a spill containment pattern having a hydrophobic pattern bounding a non-hydrophobic spill containment region.

BACKGROUND

The surfaces of various cooking appliances including cooktops, range tops, stoves, and ovens can be subject to a variety of spills occurring during the cooking process. These spills must be contained and prevented from leaking over the edge of a cooking surface. In general, commercially available cooktops include a molded member or border encapsulating the edge of the cooktop to prevent spills from exiting the cooktop surface. However, such encapsulating member designs are difficult to clean and can trap food products and liquid between the cooking appliance surface and the encapsulating member. It can be further desirable to include a trim member surrounding the burner unit, as a means of directing spilled liquids away from the hot burner unit in order to prevent the spill from burning, drying out, and crusting on the burner area. However, such trim units also can result in the accumulation of trapped food or liquid products and are difficult to clean.

SUMMARY OF THE DISCLOSURE

In an embodiment of the present disclosure, a cooking appliance having a spill containment pattern includes a cooking appliance surface having a top surface, the top surface comprising a non-hydrophobic region, at least one heating element disposed on or adjacent to the cooking appliance surface, and a spill containment pattern comprising a hydrophobic pattern disposed on the top surface and bounding at least a portion of the non-hydrophobic region, the bounded non-hydrophobic region defining a non-hydrophobic spill containment region.

In another embodiment of the present disclosure, a cooking appliance surface having a spill containment pattern includes a top surface, the top surface comprising, wherein at least a portion of the top surface is adapted to be heated by a heating element, and a portion of the top surface is non-hydrophobic, and a spill containment pattern disposed on the top surface, the spill containment patter comprising a hydrophobic pattern bounding at least a portion of the non-hydrophobic portion of the top surface, the bounded non-hydrophobic portion of the top surface defining a non-hydrophobic spill containment region.

In yet another embodiment of the present disclosure, a method of manufacturing a cooking appliance surface capable of containing spills thereon includes providing a cooking appliance surface comprising a top surface having a non-hydrophobic region, wherein at least a portion of the cooking appliance surface is adapted to be heated by at least one heating element, and forming a hydrophobic pattern on the top surface, the hydrophobic pattern arranged to bound at least a portion of the non-hydrophobic region, the bounded non-hydrophobic region defining a non-hydrophobic spill containment region.

These and other aspects, advantages and features of the disclosure will be more fully understood and appreciated by reference to the Description of the Preferred Embodiments, and the appended drawings.

BRIEF DESCRIPTION OF THE DRAWINGS

Preferred embodiments of the disclosure will now be described with reference to the drawings in which:

FIG. 7 is a an isometric view of the side and bottom walls of an electric oven having a spill containment pattern with a hydrophobic pattern disposed on the angles and bends of the recessed bottom wall, in accordance with an embodiment of the disclosure.

DETAILED DESCRIPTION

Figure 1A:
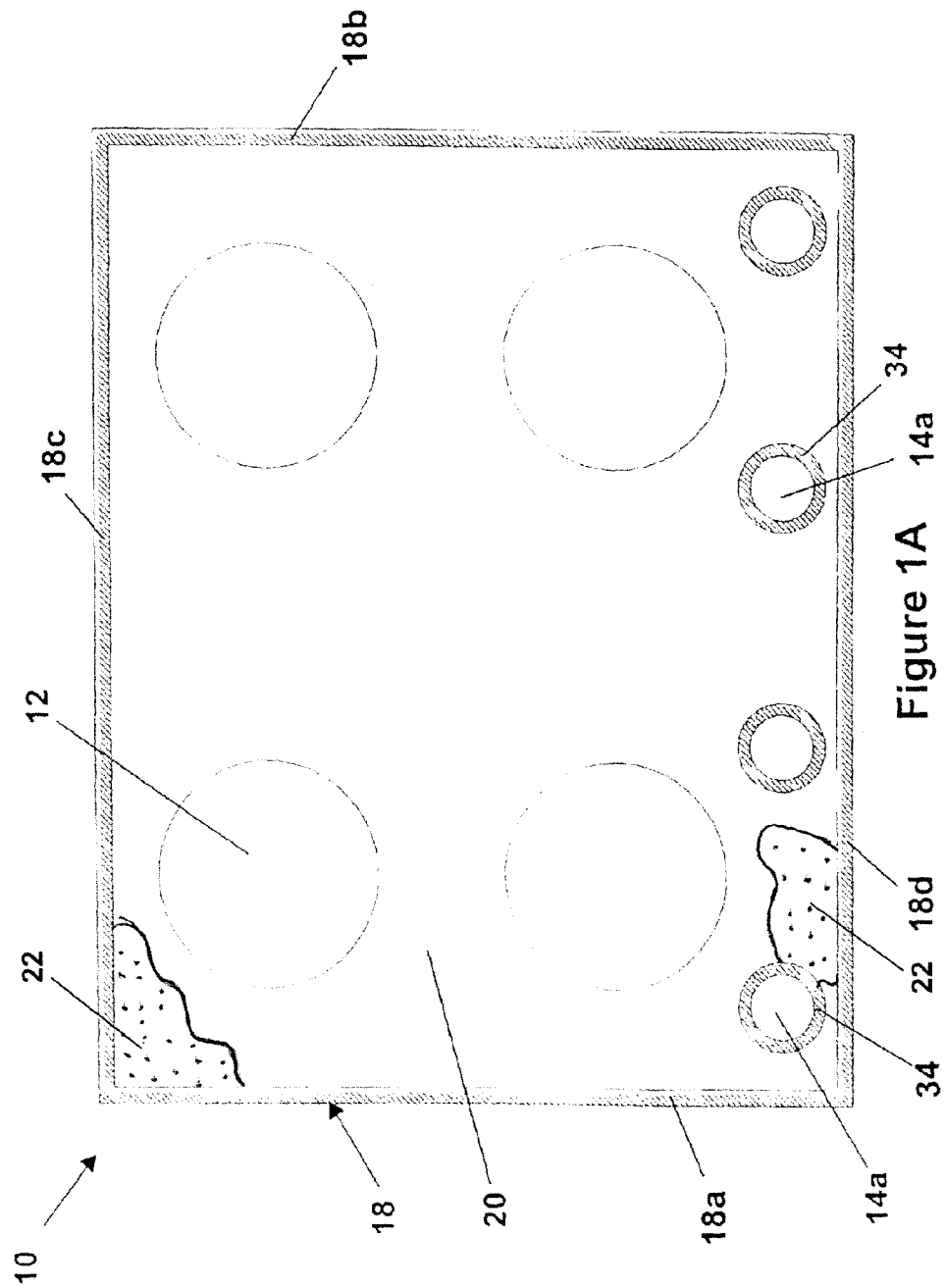
FIGS. 1A and 1B are plan views of a cooktop having a spill containment pattern with a hydrophobic pattern in the form of a frame-like border, in accordance with an embodiment of the disclosure.

The present disclosure is directed to a cooking appliance surface having a spill containing pattern disposed on a top surface of the cooking appliance surface. The cooking appliance surface can include the surface of any appliance used for cooking and/or baking, such as, cooktops, stovetops, range cooking tops, and ovens. The cooking appliance surface of the disclosure can be adapted for use with any commercially available cooktop, stove, range, oven, or any similar such appliance. The cooking appliance surface can be any shape, including, for example, a rectangle, a lazy s-shape, and an oval. Certain embodiments are especially advantageous for use with cooktops that include a glass or ceramic top surface with burners disposed beneath the top surface and one or more controls disposed on or adjacent to the top surface. At least a portion of the top surface of the cooking appliance surface is adapted to be heated by at least one heating element. For example, the cooking appliance surface can be a cooktop, with a portion of the cook disposed near the burners adapted to be heated by the burners. Alternatively, the entire top surface of the cooking appliance surface can be adapted to be heated by at least one heating element. For example, the cooking appliance surface can be the bottom wall of an oven, which is heated by the oven heating element.

As mentioned, the cooking appliance surface includes a top surface. At least a portion of the top surface is non-hydrophobic. The top surface can be formed of metal, glass, ceramic, composites, or any other suitable material, or combinations thereof. For example, the metal can be porcelain enameled metal, plated metal, including steel, cast iron, and stainless steel, and combinations thereof. The glass can be, for example, borosilicate glass, high temperature resistive glass, spun glass, glass fibers, and combinations thereof. The top surface can include a coating that allows for easy clean-up for a spill on the surface. Such a coating, however, would not function to retain spills on the top surface.

Referring to FIGS. 1-5, at least a portion of the top surface 10 is adapted to be heated by a heating element. For example, as shown in FIGS. 1-5, the top surface 10 can include burner regions 12 which are heated by a heating element. Referring to FIG. 6, the top surface 10, as used herein, can also be that of an oven wall, for example, the entirety of which is adapted to be heated by an oven heating element 36. The hydrophobic pattern 18 can be arranged in any pattern, as described in detail below. Referring to FIG. 7, the top surface 10, as used herein, can be the walls of an oven and, for example, the hydrophobic pattern 18 can applied to the angles and bends of the recessed bottom wall of an oven to direct spills to flat non-hydrophobic spill containment regions 20 that are easier for a user to clean. The cooking appliance surface can further include one or more of control knobs 14a or control panels 14b, a fan 16, or other similar features. These features can be disposed on or adjacent to the top surface 10.

The spill containment pattern, and particularly, a hydrophobic pattern 18, is generally formed so as to be in the same plane as the cooking appliance surface. The spill containment pattern can be designed to contain spills 22 resulting from over-boiling of a container of liquid or other food substance and/or to contain spills 22 of room temperature liquids or other food substances resulting from the general cooking process, for example, when pouring liquid or other food substance into a container, when placing a full container on or over the cooking appliance surface, or when removing cooking utensils from pots on a stove.

As mentioned, the spill containment pattern includes a hydrophobic pattern 18 disposed on the top surface, bounding at least a portion of the non-hydrophobic region of the top surface 10. The bounded portion of the non-hydrophobic region defines a non-hydrophobic spill containment region 20. The hydrophobicity of the hydrophobic pattern 18 repels a spilled liquid or other food substance and causes the same to bead up or puddle up in the non-hydrophobic spill containment region 20. In some embodiments, the spill containment pattern can retain a spill 22 having a height when pooled in the non-hydrophobic spill containment region 20 of less than about 5.5 mm. For example, the spill containment pattern can retain a spill having a height of about 0.5 mm, about 1 mm, about 1.5 mm, about 2 mm, about 2.5 mm, about 3 mm, about 3.5 mm, about 4 mm, about 4.5 mm, about 5mm, or about 5.5 mm. The height of the spilled liquid provides a measure of the amount of spilled liquid retained by a top surface regardless of the area of the non-hydrophobic spill containing region of the top surface. The height of the retained spilled liquid is determined by dividing the volume of spilled liquid retained by the top surface before failure (i.e. leakage) by the area of the non-hydrophobic spill containing region.

The hydrophobic pattern 18 can be disposed in substantially the same plane as the top surface 10. For example, the hydrophobic pattern 18 can have a thickness of from about 0.001 microns to about 250 microns. Other suitable thickness ranges include from about 0.001 microns to about 2 microns, about 0.01 microns to about 1.5 microns, about 0.1 microns to about 1 microns, about 0.001 microns to about 10 microns, about 0.01 microns to about 8 microns, about 0.05 microns to about 7 microns, about 0.1 microns to about 5 microns, about 1 micron to about 4 microns, about 1 micron to about 10 microns, about 2 microns to about 8 microns, about 4 microns to about 6 microns, about 10 microns to about 100 microns, about 20 microns to about 80 microns, about 40 microns to about 60 microns, about 100 microns to about 250 microns, about 150 to about 200 microns, about 1 micron to about 250 microns, about 10 microns to about 200 microns, about 20 microns to about 150 microns, about 30 microns to about 100 microns, about 40 microns to about 80 microns, and about 50 microns to about 70 microns. Other suitable thickness include, for example, about 0.001, 0.005, 0.01, 0.05, 0.1, 0.5, 1, 5, 10, 15, 20, 30, 40, 50, 60, 70, 80, 90, 100, 110, 120, 130, 140, 150, 160, 170, 180, 190, 200, 210, 220, 320, 240, and 250 microns.

Figure 1B:
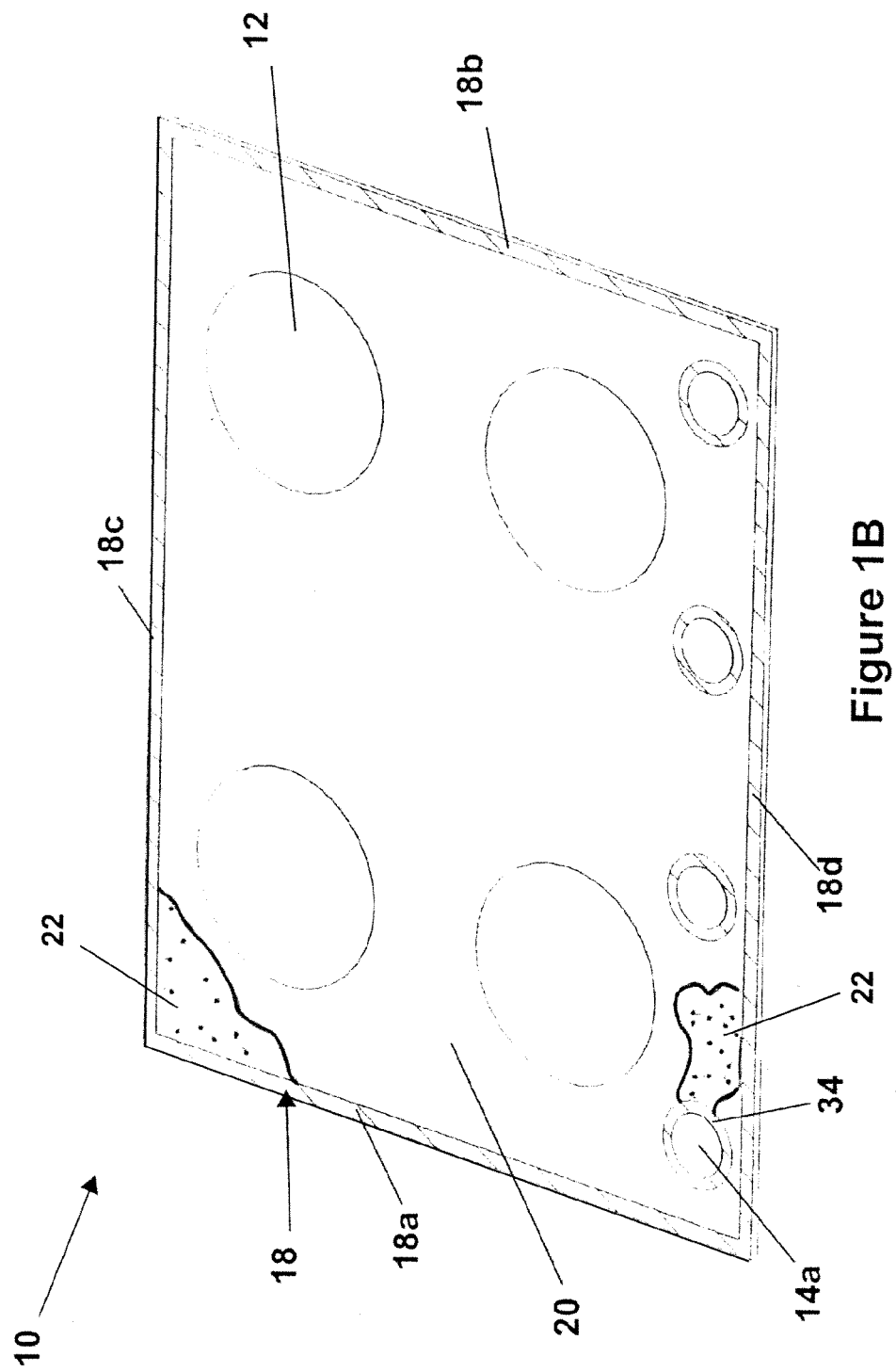

A variety of spill containment patterns can be used depending on the desired spill containment effect. Referring to FIGS. 1A and 1B, for example, the hydrophobic pattern 18 can be in the form of a single, frame-like border that extends along the perimeter of the top surface 10. In this case, a spill 22 (not shown) is prevented from exiting the top surface, and rather is forced by the bounding hydrophobic pattern 18 to remain in the non-hydrophobic spill containment region 20.

More specifically, the hydrophobic pattern 18 can include a continuous pattern formed of parallel left and right side edge containment strips 18a, 18b, and parallel front and rear edge containment strips 18c, 18d, i.e., all respectively engaged to adjacent ones. Each of the edge containment strips 18a-18d is generally uniform in width. In forming a frame-like border hydrophobic pattern 18, as shown in FIGS. 1A and 1B, the containment strips can be disposed directly at a respective edge of the top surface 10. That is, in the embodiment depicted in FIGS. 1A and 1B, there is no non-hydrophobic area on the top surface 10 between the hydrophobic pattern 18 and the perimeter edge of the top surface 10. In alternative embodiments of a frame-like hydrophobic pattern, however, at least one of the strips 18a-18d can be offset inward from the perimeter edge of the top surface 10 such that the top surface can include a non-hydrophobic area disposed between at least a portion of the hydrophobic pattern 18 and the perimeter edge of the top surface 10.

The side edge containment strips 18a, 18b are disposed at substantially right angles relative to the front and rear edge containment strips 18c, 18d. So configured, the hydrophobic pattern 18 of the embodiment depicted in FIGS. 1A and 1B forms a continuous, generally square, rectangular, and/or box-shape completely bounding, encircling, and/or enclosing the non-hydrophobic spill containment region 20, which also has a generally square, rectangular, and/or box-shape.

Figure 2A:
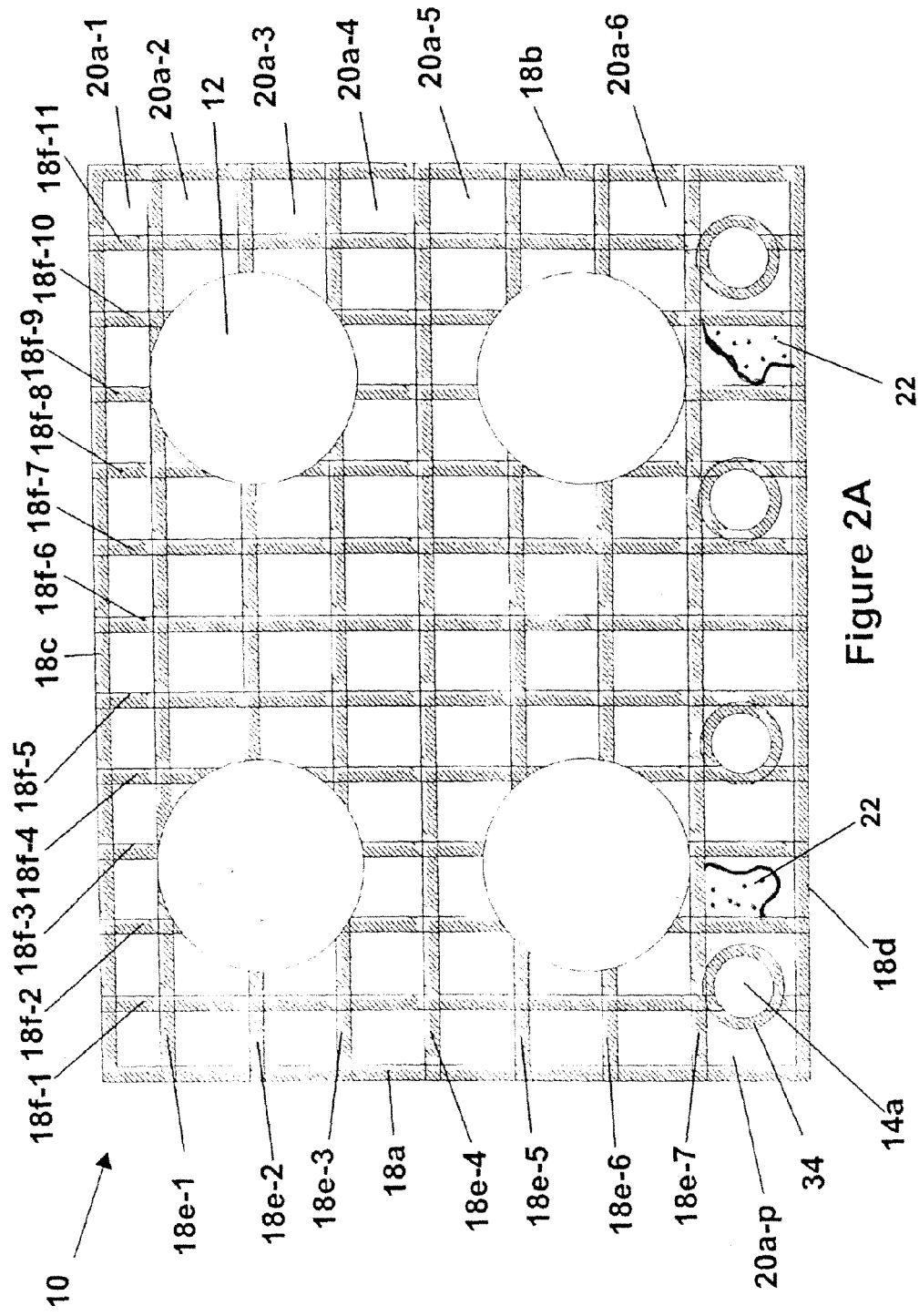
FIGS. 2A and 2B are plan views of a cooktop having a spill containment pattern with a hydrophobic pattern in the form of a grid pattern, in accordance with an embodiment of the disclosure.
Figure 2B:
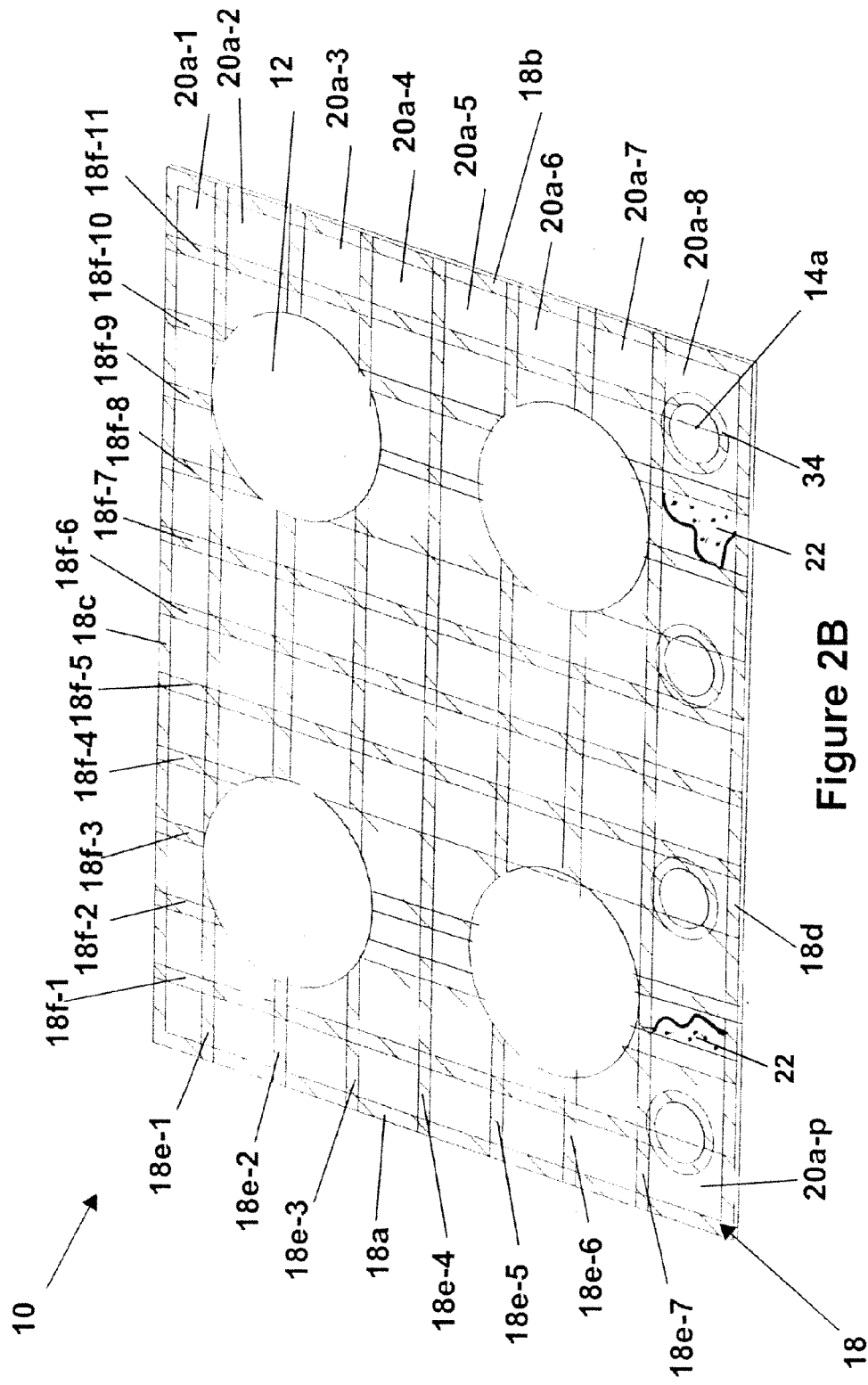

Referring to FIGS. 2A and 2B, the hydrophobic pattern 18 can also be arranged in a grid type pattern thereby defining a plurality of non-hydrophobic spill containment regions 20. The grid-like spill containment pattern includes a plurality of spaced apart longitudinal spill containment strips 18e-1 to 18e-n (n being the number of longitudinal spill containment strips included in the pattern) and a plurality of lateral spill containment strips 18f-1 to 18f-m (m being the number of lateral spill containment strips included in the pattern). For example, the grid like pattern illustrated in FIG. 2A includes seven longitudinal spill containment strips 18e-1 to 18-7, and eleven lateral spill containment strips 18f-1 to 18f-11. The longitudinal spill containment strips 18e-1 to 18e-n intersect the lateral spill containment strips 18f-1 to 18f-n at generally right angles. As depicted, the longitudinal spill containment strips 18e-1 to 18e-n are parallel to each other, as well as parallel to the left and right side spill containment strips 18a, 18b (if present). Moreover, the lateral spill containment strips 18f-1 to 18f-n are parallel to each other, as well as parallel to the front and rear spill containment strips 18c, 18d (if present). Other configurations are intended to be within the scope of the disclosure. For example, the respective sets of spill containing strips could be angled to one another, or one or both of them could be curved or wavy. The grid-like pattern can also be disposed across the burner 12, the control knobs 14a, the control panel 14b, and/or the fan region 16. Alternatively, as shown in FIG. 2A, the burners 12 or other regions can remain uncovered by the grid-like pattern or any other portion of the hydrophobic pattern 18.

The grid-like hydrophobic pattern 18 defines a plurality of non-hydrophobic spill containment regions 20a-1 to 20a-p (where p is the number of non-hydrophobic spill containment regions disposed on the top surface 10). In general, each of the non-hydrophobic spill containment regions 20a-1 to 20a-p is completely bounded, encircled, and/or enclosed by four of the spill containment strips and is therefore square, rectangular, and/or box-shaped. In the case where the grid pattern is not continuously disposed over the burners 12, control knobs 14a, control panels 14b, or fan 16 regions, the non-hydrophobic spill containment regions disposed near those features may have a different shape and may be bounded by four spill containment strips, with portions of other spill containment strips being disposed within the non-hydrophobic spill containment region 20. In the grid-like arrangement, each of the non-hydrophobic spill containment regions 20a-1 to 20a-p is capable of containing a spill 22 (not shown) separate from the other non-hydrophobic spill containment regions 20a-1 to 20a-p.

Figure 3:
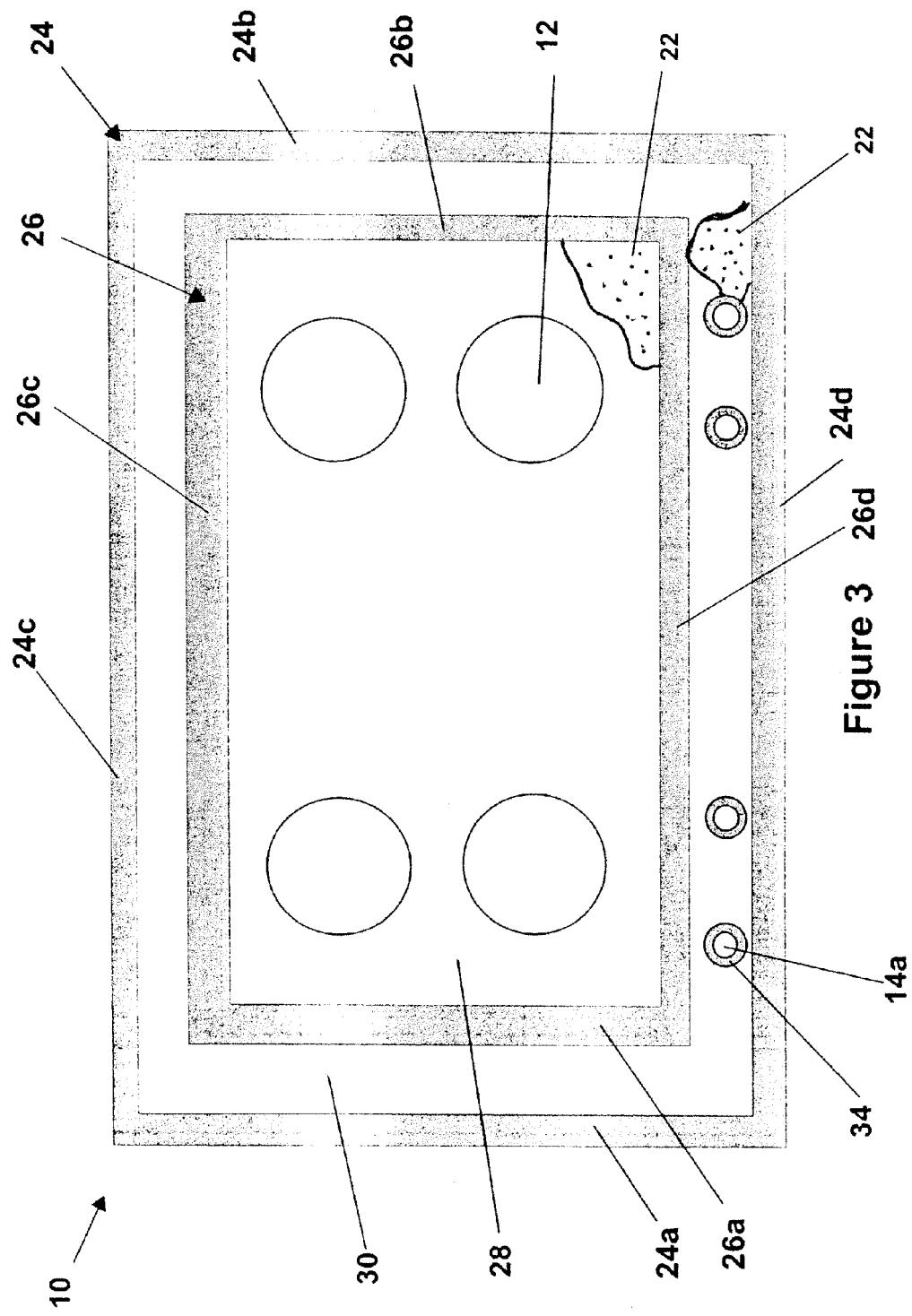
FIG. 3 is a plan view of a cooktop having a spill containment pattern with a double frame-like border hydrophobic pattern, in accordance with an embodiment of the disclosure.

Referring to FIG. 3, the hydrophobic pattern can also comprise multiple frame-like borders on the top surface 10. For example, as illustrated in FIG. 3, the hydrophobic pattern 18 can have a double-border configuration consisting of a first continuous hydrophobic surface border 24 and a second continuous hydrophobic surface border 26 disposed inside of the first hydrophobic surface border 24.

The first hydrophobic surface border 24 can be disposed about the perimeter edge of the top surface 10, and the second hydrophobic surface border 26 can be offset inwardly from the first hydrophobic surface border 24. The first hydrophobic surface border 24 includes parallel left and right side edge containment strips 24a, 24b, and parallel front and rear edge containment strips 24c, 24d. Each of the edge containment strips 24a-24d of the first continuous hydrophobic surface border 24 is generally uniform in width and arranged in an elongated linear configuration directly at the edge of the perimeter of the top surface 10. The side edge containment strips 24a, 24b are disposed at right angles relative to the front and rear edge containment strips 24c, 24d. So configured, the first hydrophobic surface border 24 forms a continuous generally square, rectangular, and/or box-shape completely bounding, encircling, and/or enclosing the non-hydrophobic spill containment region 28, which is also generally square, rectangular, and/or box-shaped.

Moreover, as depicted, the second continuous hydrophobic surface border 26 includes parallel left and right side edge containment strips 26a, 26b, and parallel front and rear edge containment strips 26c, 26d. Each of the edge containment strips 26a-26d of the second hydrophobic surface border 26 is generally uniform in width and arranged in an elongated linear configuration offset inwardly from the first hydrophobic surface border 24. The side edge containment strips 26a, 26b are disposed at right angles relative to the front and rear edge containment strips 26c, 26d such that the second hydrophobic surface border 26 forms a generally square, rectangular, and/or box-shape completely bounding, encircling, and/or enclosing a portion of the non-hydrophobic spill containment region 28 of the top surface 10. So configured, the first and second hydrophobic surface borders 24, 26 define a non-hydrophobic spill containment ring region 30 located between the two borders 24, 26. The non-hydrophobic spill containment ring region 30 can advantageously capture any spill overflow which might escape from the non-hydrophobic spill containment region 28 and travel over the second hydrophobic surface border 26.

These and other variations in the spill containment pattern 18 can be made without departing from the spirit and scope of the novel concepts of the preferred embodiments of the present disclosure. For example, while FIG. 3 depicts a double-border pattern, a pattern of any number concentric or non-concentric border patterns could be provided on the top surface 10. Each border pattern can, for example, surround at least a portion of the non-hydrophobic region. Furthermore, a grid-like hydrophobic pattern can be formed in any of the non-hydrophobic spill containment regions to further define smaller non-hydrophobic spill containment regions.

Figure 4:
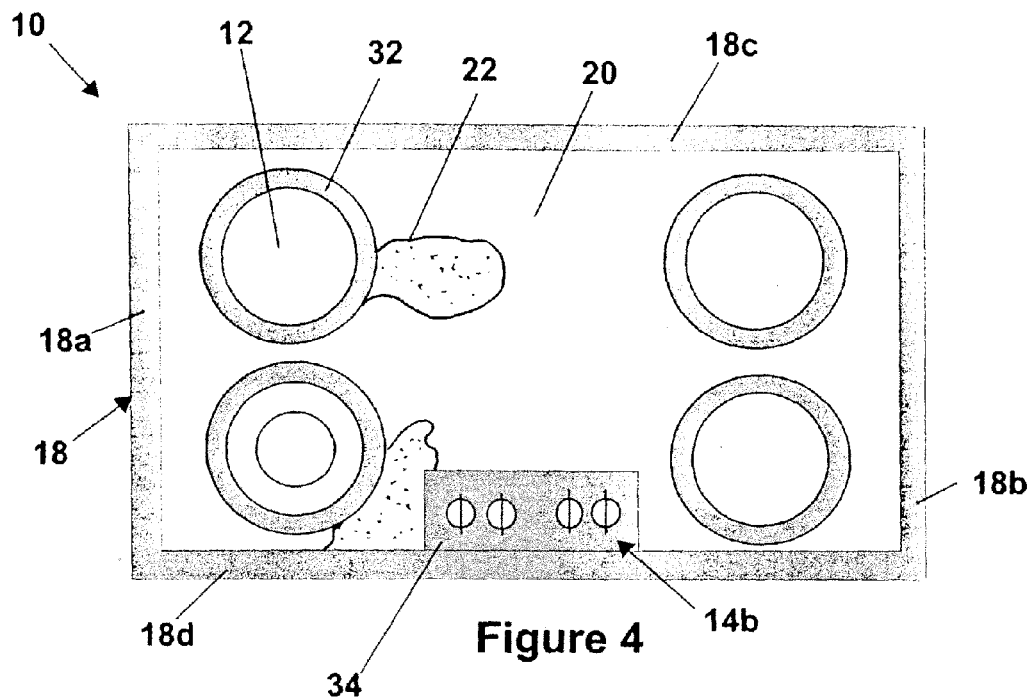
FIG. 4 is a plan view of a cooktop having a spill containment pattern having a hydrophobic pattern surrounding burner and control regions of the cooktop, in accordance with an embodiment of the disclosure.
Figure 5:
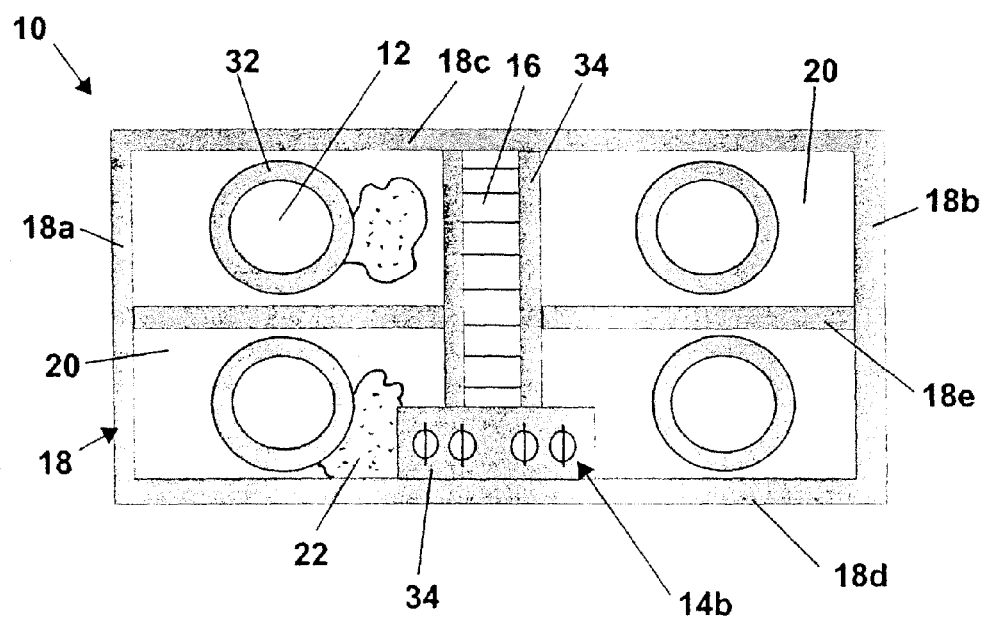
FIG. 5 is a plan view of a cooktop having a spill containment pattern having a hydrophobic pattern surrounding burner, control, and fan regions of the cooktop, in accordance with an embodiment of the disclosure.
Figure 6:
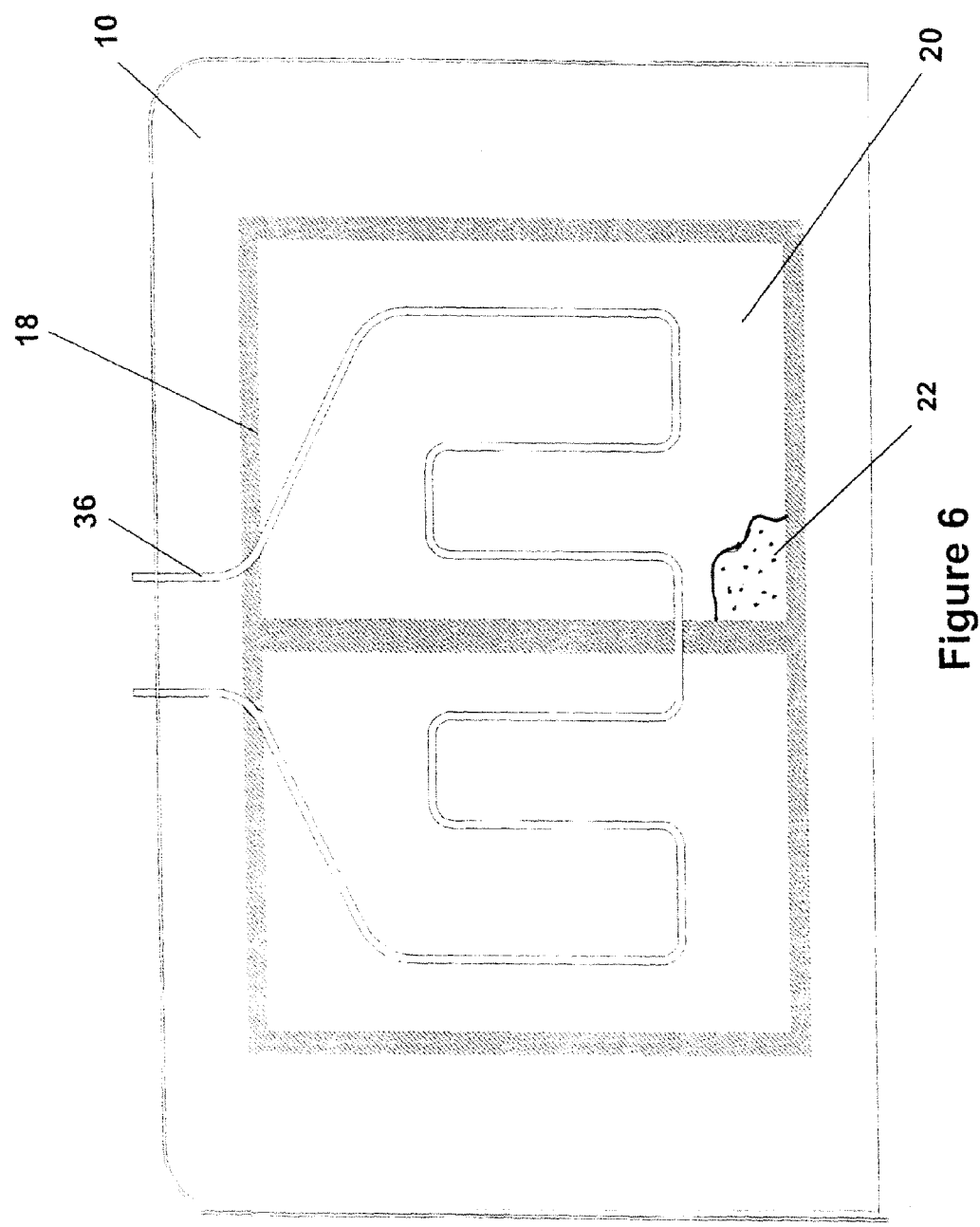
FIG. 6 is a top plan view of the bottom burner wall of an electric oven having a spill containment pattern in accordance with an embodiment of the disclosure.

Referring to FIGS. 4 and 5, the hydrophobic pattern 18 can be disposed to direct spills 22 away from a particular region of the cooking appliance surface, including, for example, heated regions of the top surface, control knobs 14a or panels 14b, fan and vent openings, such as an exhaust intake grill area 16 of a fan (not shown), cal rods, and the like. For example, the hydrophobic pattern 18 can include a portion 32 that is disposed adjacent to and/or surrounds the regions of the top surface adapted to be heated by the heating element, thereby preventing spills 22 from entering the region of the top surface 10 adapted to be heated by the heating element. Referring to FIGS. 1-4, the hydrophobic pattern 18 can also include a portion 34 that is disposed adjacent to, surrounding, and/or covering control knobs 14a, control panels 14b, intake fan regions 16, surface-mounted timer/clocks, or any other similar feature which is disposed on or adjacent to the top surface 10. Any combination of the above-described hydrophobic pattern 18 arrangements or any other hydrophobic pattern 18 arrangements can be used and can be designed so as to direct a spill 22 to a particular region of the top surface 10.

To illustrate the concepts of liquid spillage, a spill 22 is illustrated in FIGS. 4 and 5. As shown in the figures, the hydrophobic pattern 18 contains the spill 22 in the non-hydrophobic spill containment region 20, thereby preventing the spill 22 from exiting the top surface 10. Portions of the hydrophobic pattern 32 and 34 disposed about the burner regions 12 and the control knob 14a, control panel 14b, and fan intake region 16, prevent the spill from entering those regions. Thus, from the foregoing, the present disclosure encompasses a high temperature type surface that includes hydrophobic (or super hydrophobic) patterns of materials disposed thereon for (1) containing spills within a pre-defined area, (2) repelling spills from a pre-defined area, as well as (3) hydrophobic (or super hydrophobic) patterns specifically configured to contain spills in some areas and simultaneously repel spills from other areas.

The hydrophobic pattern 18 is formed by applying a hydrophobic or super hydrophobic compound to the top surface 10 in the desired hydrophobic pattern 18 arrangement. A variety of hydrophobic or super-hydrophobic compounds can be used to form the hydrophobic pattern, and the compounds can be applied by a variety of methods. If it is desired to contain hot liquids, the hydrophobic or super-hydrophobic material should be adapted to maintain its hydrophobicity when contacted with the hot liquids, so as to be able to repel the hot liquids and direct them to pool in the non-hydrophobic spill containment region 20 of the top surface 10 of the cooking appliance surface. In general, as to domestic and professional cooking procedures, hot liquids have a temperature in a range of 50° C. to about 210° C. For example, suitable hydrophobic materials for use in repelling hot liquids can include, fluorocarbons, flurorpolymers such as polytetrafluoroethylene (commercially available from DuPont as TEFLON), a superhydrophobic surface coating using TEFLON (See Van der Wal et al., 3 Soft Matter 426 (2009)), silicone based coatings, a composite of polytetrafluoroethylene (commercially available from DuPont as TEFLON) and carbon nanotubes (See Liu et al., 19 J. Materials Chem. 5602 (2009)), and combinations thereof.

As described above, at least a portion of the top surface 10 of the cooking appliance surface is adapted to be heated by a heating element. In various embodiments of the disclosure, the hydrophobic pattern 18 is disposed on or near the regions of the top surface 10 adapted to be heated by the heating element. In these embodiments, the hydrophobic or super-hydrophobic compound and any other compounds used to form the hydrophobic pattern 18 should be suitable for use on a heated surface. For example, the hydrophobic or super-hydrophobic material should be suitable for use on a surface having a temperature in a range of ambient temperature to about 500° C. Preferably, the hydrophobic compound and any other compounds used to form the hydrophobic pattern 18 are stable and resilient against repeated heating and cooling cycles.

Examples of hydrophobic compounds for use in forming the hydrophobic pattern 18 include, for example, organic polymers, inorganic polymers, fluorocarbons, olefins, nanomaterials, nanomaterial-organic polymer blends, ceramics, and combinations thereof. The organic polymers include fluoropolymers, graph polymers, copolymers, and blends. Specific fluoropolymers include, for example, PTFE/polyphenylene sulfide blends and copolymers, plasma deposited fluoropolymer coating from CFC-113 and $C_2H_4$, plasma deposited fluoropolymer coatings from precursors that include $CF_4$, $C_2F_6$, $C_4F_8$, and mixtures thereof, electrospun initiated-chemical vapor deposited perfluoroalkyl ethyl methacrylate, fluoropolyamide-polyimide polymers, and fluorinated graph polymers. Also suitable are blends of polysulfone resins and fluoropolymers. The inorganic polymers include, for example, organopolysiloxanes, fluoropolysiloxane, and fluorinated polyester modified polysiloxane polymers. The fluorocarbons include, for example, fluoroalkyl silanes, fluoroalkoxy silanes, fluoroalkyl alkyl silanes, and combinations thereof. Specific silanes include, for example, tridecafluoro-1,1,2,2-tetrahydrooctyl trichlorosilane, non-afluorohexyldimethyl-(dimethylamino)silane, heptadecafluorotetrahydrodecyldimethyl(dimethylamino)silane, tetrandyrodecyl-tris(dimethylamino)silane, tridecafluoro-1,1,2,2,-tetrahydrooctyl silane, (tridecafluoro-1,1,2,2-tetrahydooctyl) trimethoxysilane, (tridecafluoro-1,1,2,2-tetrahydooctyl) triethoxysilane, n-octadecyl trimethoxysilane, n-octyl triethoxysilane, and heptadecafluoro-1,1,2,2-tetrahedyodecyl-tris(dimethylamino)silane. Nanomaterials include, for example, colloidal silica, 60-nm $SiO_2$ on $NH_3$-terminated self-assembled monolayers, silica nanocrystals, silica nanowires, silica nanofibers, silica nanorods, silica nanotrees, colloidal silica mixed with n-hexane, silica nanofibers coated with an organic polymer, an inorganic polymer, fluoro and/or silyl compounds, e.g., PTFE, Tri-sil, tridecafluoro-1,1,2,2-tetrahydrooctyl-1-tricholorosilane, hexamethyldisilazane, aliphatic hydrocarbon containing molecules, aromatic hydrocarbon containing molecules, halogen containing molecules, and paralyene. Ceramics include, for example, patterned $SiO_2$/$TiO_2$ surfaces treated with a fluoroalkylsilane, roughened silica, $Si_3TiO_8$, fumed silicon dioxide, silica aerogel, and glow discharged polymerized silicon. Other suitable ceramics include, for example, $TiO_2$, $MgAl_2O_4$ spinels, diatomaceous earth, colloidal silver impregnated polymer matrices, carbonized lotus leaf, graphite on polytetrahaloethylene, ZnO and/or MgO deposited on polytetrahaloethylene, CVD deposited diamond, nano-laminas of boron nitride, hydrophobic zeolites, such as $(SiO_2)_{10+}(Al_2O_3)$, and hydrophobic aerogels.

Any method of applying the hydrophobic compound to form the hydrophobic spill containment pattern may be used. For example, the hydrophobic compound can be applied using an application technique such as spraying; brushing; wiping; dipping; solvent casting; flow coating; curtain coating; roller coating; spin coating; printing; screen printing; ink jet printing; vacuum coating; magnetic field-assisted cathodic sputtering; plasma deposition; plasma magnetron deposition; chemical vapor deposition ("CVD"); plasma or atmospheric CVD; powder or liquid pyrolysis; atomization; electrophoretic deposition; cross-linking processes; and combinations thereof.

In various embodiments the hydrophobic pattern 18 can be formed by first roughening the portion of the top surface 10 to be made hydrophobic using various methods, and then applying a hydrophobic compound to the roughened surface. Suitable roughening methods include, for example, sanding, abrading, etching, such as acid etching, or otherwise removing material from the top surface 10.

Etching can be performed using, for example, hydrofluoric acid, sodium silicate, bifluorides, including for example, a ammonium bifluoride sodium bifluoride, and mixtures thereof, any other known etching solutions, and any mixtures thereof. Commercially available etching solutions are available, for example from Armour® Products (Hawthorne, N.J.). For examples, the Armour Etch Bath® Glass Dipping Solution (product name) or Armour Etch® Glass Etching Cream (product name), available from Armour® Products can be used, and includes a mixture of ammonium bifluoride and sodium bifluoride. The etching solution can be applied to the top surface 10 with an applicator in the desired pattern. A mask, which is resistant to the etching solution, can be placed on the region of the top surface 10 to be non-hydrophobic to protect this region from being etched. The etching solution can be allowed to remain on the top surface for a time in a range of about 15 seconds to about 20 minutes, about 20 seconds to about 15 minutes, about 30 seconds to about 10 minutes, about 45 seconds to about 8 minutes, about 1 minute to about 10 minutes, about 2 minutes to about 8 minutes, about 4 minutes to about 6 minutes, about 15 seconds to about 1 minute, about 20 seconds to about 50 seconds, about 25 seconds to about 45 seconds, about 30 seconds to about 40 seconds, about 1 minute to about 20 minutes, about 5 to about 15 minutes, or about 7 minutes to about 10 minutes. Other suitable times include, for example, about 15 seconds, 20 seconds, 25 seconds, 30 seconds, 35 seconds, 40 seconds, 45 seconds, 50 seconds, 55 seconds, 1 minute, 2 minutes, 3 minutes, 4 minutes, 5 minutes, 6 minutes, 7minutes, 8 minutes, 9 minutes, 10 minutes, 11 minutes, 12 minutes, 13 minutes, 14 minutes, 15 minutes, 16 minutes, 17 minutes, 18 minutes, 19 minutes, and 20 minutes.

The hydrophobic pattern 18 can also be formed, for example, by providing a coating of hydrophobic particles on the surface, by using sol-gel deposition, either on top of or within the matrix of the sol-gel, by applying a metal oxide primer with an integrated or separate hydrophobic compound, by applying a hydrophobic compound comprising a variety of molecular chain lengths to create a coating with surface irregularities, or by adhering a thin material to the surface, such as a tape of thin glass or plastic which has been made hydrophobic. The hydrophobic pattern 18 can be formed, for example, by applying a frit material, such as a ceramic or porcelain frit material, with or without structure forming particles therein, to the top surface 10 in the desired pattern arrangement, curing the frit, and then applying a hydrophobic compound over the cured frit and curing the hydrophobic compound. The frit can be a ceramic frit, a porcelain frit, or a combination thereof. In some embodiments, the frit layer can have a thermal insulating effect sufficient to prevent or reduce the amount of heat transfer that may occur between the top surface and the hydrophobic material applied thereto, thereby increasing the useful life of the hydrophobic pattern by reducing potential thermal degradation.

Any combination of the above-described surface treatment methods can be also be used. For example, the top surface 10 can be first prepared by applying and curing a frit material to the top surface 10. The frit material can then be etched using an etching solution as described above, and a hydrophobic compound can be applied to the etched frit. Alternatively, the entire top surface 10 including the frit material can be etched using an etching solution, and a hydrophobic compound can then be applied to the etched ceramic frit. Without intending to be bound by theory, it is believed that etching the frit prior to application of the hydrophobic compound can improve the hydrophobic properties of the hydrophobic pattern 18 by creating additional bonding sites on the frit to which the hydrophobic compound can bond. Additionally, the etched frit may include more surface area to which the hydrophobic compound can attached by virtue of the combined macro-scale surface roughening provided by the frit and micro-scale surface roughening provided by etching the frit.

The hydrophobic surface treatments described herein can be cured according to a number of different methods, if curing is required by the surface preparation or the hydrophobic compound, including without limitation: conduction heating; convection heating; UV radiation; VUV radiation; electron beam irradiation; ionizing radiation; laser; IR; and thermal radiation. The hydrophobic surface treatments can also be cured by remaining at ambient conditions for a sufficient length of time, for example, from about 16 hours to about 48 hours, from about 20 hours to about 40 hours, and from about 25 hours to about 35 hours. Curing can be performed in a controlled humidity environment. For example, curing can be performed at less than 70% humidity, less than 60% humidity, less than 50% humidity, less than 40% humidity, less than 30% humidity, less than 20% humidity, less than 10% humidity, or at 0% humidity.

In one embodiment, the cooking appliance assembly comprises a glass, a glass ceramic, or a tempered glass top surface 10 which is printed, e.g., screen printed, with a frit material, over which a hydrophobic coating can be applied if needed to impart hydrophobicity to the frit. The frit can be patterned on the top surface 10 using any known placing, printing, or other patterning methods. The frit material is placed or printed in a pattern, for example, a frame-like border pattern on the top surface 10, which defines at least a portion of the spill containment pattern. For example, the frit material can be screen printed onto the top surface 10 in the desired pattern using, for example, a silk screen having a mesh count in a range of about 80 to about 360, about 100 to about 300, about 120 to about 280, about 140 to about 240, about 160 to about 220, about 180 to about 200, about 86 to about 360. Other suitable mesh counts include about 80, 82, 84, 86, 88, 90, 92, 94, 96, 98, 100, 110, 120, 130, 140, 150, 160, 170, 180, 190, 200, 210, 220, 320, 240, 250, 260, 270, 280, 290, 300, 310, 320, 340, 350, and 360. Various other mesh counts may be suitable depending on the composition and particle size of the frit material used. As described in above, the hydrophobic pattern 18, and consequently, the frit pattern, can have a variety of shapes and sizes, and can be placed in a variety of locations on the glass top surface 10. Additionally, portions of the hydrophobic pattern 18 can be formed, for example, using different hydrophobic compounds and/or different surface treatments. For example, a portion of the hydrophobic pattern 18 can be formed, for example, by applying and curing a ceramic frit to the top surface 10 and applying a hydrophobic compound to the cured frit, and another portion of the hydrophobic spill containment pattern can be formed, for example, by acid etching a portion of the top surface 10 and applying the hydrophobic compound to the etched portion.

In accordance with various aspects of the invention, the frit material can include finely ground particles. For example, the ceramic frit material can include lead oxide, silicon dioxide, aluminum oxide, and mixtures thereof. Preferably, the frit material includes silicon dioxide. For example, the frit material includes from 5 weight percent (wt. %) to about 100 wt. % silicon dioxide, from about 10 wt. % to about 80 wt. %, from about 20 wt. % to about 60 wt. % from about 30 wt. % to about 40 wt. % from about 15 wt. % to about 75 wt. %, from about 20 wt. % to about 50 wt. %. Other suitable amounts of silicon dioxide in the frit material can include, for example, 5, 10, 15, 20, 25, 30, 35, 40, 45, 50, 55, 60, 65, 70, 75, 80, 85, 90, 95 and 100 wt. %. The ceramic frit material can include about 29 wt. % silicon dioxide. The ceramic frit material can also include, for example, additives, such as tantalum oxide, titanium dioxide, calcium oxide, zirconium oxide, sodium oxide, potassium oxides, iron oxide magnesium oxide, barium oxide, bismuth oxide, and mixtures thereof Suitable commercially available frit materials can be used. For example, a commercially available frit material is available from Ferro Corp. (hereinafter "the Ferro frit") under Product No. A0430 Etch C32 Medium, and contains about 53.71 wt. % lead oxide, about 29 wt. % silicon dioxide, 15.72 wt. % aluminum oxide, 0.39 wt. % tantalum oxide, 0.38 wt. % titanium dioxide, 0.28 wt. % calcium oxide, 0.26 wt. % zirconium oxide, 0.11 wt. % sodium oxide, 0.04 wt. % potassium oxide, 0.04 wt. % iron oxide, 0.03 wt. % magnesium oxide, 0.02 wt. % barium oxide, and 0.02 wt. % bismuth oxide. Another suitable a commercially available frit material is available from Ferro Corp. (hereinafter "the Ferro frit") under Product No. GAL-41727, and contains about 36.25 wt. % lead oxide, about 33.82 wt. % silicon dioxide, 4.31 wt. % aluminum oxide, 19.74 wt. % zinc oxide, 5.50 wt. % titanium dioxide, 0.13 wt. % potassium oxide, 0.08 wt. % iron oxide, 0.07 wt. % zirconium oxide, 0.04 wt. % niobium oxide, 0.02 wt. % calcium oxide, 0.02 wt. % magnesium oxide, 0.01 wt. % cobalt oxide, and 0.01 wt. % nickel oxide.

The particles of the frit material may be mixed with inorganic or organic pigments or dyes, so as to yield a desired color. The frit material may be provided as a dry powder or as a paste or other such mixture. Once the frit material is placed on the top surface 10, the frit is then coupled to the top surface 10. For example, the frit can be coupled to the top surface 10 by fusing the frit to the top surface 10. The frit can be coupled or fused to top surface 10 by heating the top surface 10 to a temperature in a range of about 1000° F. to about 1400° F., about 1100° F. to about 1300° F., about 1100° F. to about 1200° F., and about 1200° F. to about 1400° F. Other suitable temperatures include about 1000° F., 1050° F., 1100° F., 115020 F., 1200° F., 1250° F., 1300° F., 1350° F., and 1400° F. This heat treatment will cause the particles of the frit to cure by fusing to each other and to the glass surface to form a continuous structure and thereby couple the frit to the top surface 10. The pattern of the fused frit will be substantially identical to the pattern in which the frit material was placed on the top surface 10. It is believed that this fused frit coating can be characterized as being nearly as hard and tough as the glass itself.

In one embodiment, the frit can include some micro-scale additive particles which will remain unmelted at the temperature at which the frit is sintered, as described for example in U.S. Pat. Nos. 4,591,530, 6,872,441, 6,800,354, 5,324,566, and 5,437,894, the disclosures of which are incorporated herein by reference in their entirety. The frit is printed or placed in the pattern of a frame-like border at or near the outer perimeter of the cooking appliance surface or other desired location for the spill containment pattern. The surface with the printed frit is then heated to a temperature above the melting point of the primary components of the frit material, but below the melting point of the material of the cooking appliance surface, for a time sufficient to cure the frit so that it is fused or bonded to the surface. The specific time and temperature required to sinter the frit will vary based on the materials chosen for the frit.

The hydrophobic compound can be applied to the fit material as a hydrophobic solution, which includes a solvent and the hydrophobic compound dissolved or dispersed in the solvent. The solvent can be, for example, dry or wet hexane. Suitable solvents include, for example, hexane, heptanes, methyl chloride, naptha, toluene, acetone, perfluorocarbons, and mixtures thereof. The hydrophobic solution can include from about 0.1% to about 5% of hydrophobic compound. Other suitable ranges include, for example, about 0.5% to 4%, about 1% to about 3%, about 1% to about 5%, and about 2% to about 4%. Suitable amounts of the hydrophobic compound in the hydrophobic solution, can include, for example, about 0.1, 0.2, 0.3, 0.4, 0.5, 0.6, 0.7, 0.8, 0.9, 1, 1.5, 2, 2.5, 3, 3.5, 4, 4.5, and 5%. For example, a 1% solution of tridecafluoro-1,1,2,2-tetrahydrooctyl trichlorosilane, a perfluoroalkyl alkyl silane, in hexane, can be applied, for example by wiping the solution onto the cooking appliance surface or a frit or other surface pretreatment, or applying the solution using an applicator tip, or by using any other known method. The hydrophobic compound can be applied to the solution using, for example, a one pass method in which a coated applicator is swept across the region designed as the spill containment pattern a single time or a multiple pass method in which the applicator is passed over the frit border two or more times.

The hydrophobic solution is then cured by heating it and/or exposing it to controlled humidity for a period of time. For example, conductive heating, convention heating, thermal radiation, UV radiation, VUV radiation, electron beam irradiation, ionizing radiation, laser, IR can be used to cure the hydrophobic solution. The hydrophobic solution can be cured, for example, at a temperature in a range of about 100° F. to about 600° F., about 150° F. to about 550° F., about 200° F. to about 500° F., about 250° F. to about 450° F., about 300° F. to about 350° F., or about 100° F. to about 300° F. Other suitable temperatures include, for example, about 100° F., 150° F., 200° F., 250° F., 300° F., 350° F., 400° F., 450° F., 500° F., 550° F., and 600° F. The hydrophobic solution can be cured, for example, by heating for a time in a range of about 2 seconds to about 1 hour, about 2 seconds to about 1 minute, about 4 seconds to about 50 seconds, about 6 seconds to about 40 seconds, about 8 seconds to about 30 seconds, about 10 seconds to about 20 seconds, about 2 seconds to about 5 seconds, about 25 seconds to about 1 minutes, about 5 minutes to about 1 hour, about 10 minutes to about 45 minutes, about 20 minutes to about 30 minutes, about 10 minutes to about 20 minutes, and about 15 minutes to about 30 minutes. Other suitable times include, for example, about 2 seconds, 4 seconds, 6 seconds, 8 seconds, 10 seconds, 15 seconds, 20 seconds, 25 seconds, 30 seconds, 35 seconds, 40 seconds, 50 seconds, 55 seconds, 60 seconds, 5 minutes, 10 minutes, 15 minutes, 20 minutes, 25 minutes, 30 minutes, 35 minutes, 40 minutes, 45 minutes, 50 minutes, 55 minutes, and 60 minutes.

Alternatively, the hydrophobic solution can be cured without heating. Heating, however, can accelerate the curing process. For example, the hydrophobic solution can be allowed to cure by leaving the glass top surface 10 having the cured ceramic frit coated with the hydrophobic solution in ambient conditions for a time in a range of about 16 to about 48 hours, about 20 to about 40 hours, about 25 to about 35 hours, about 16 to about 24 hours, or about 20 hours to about 30 hours. The hydrophobic solution can be cured, whether at elevated temperatures or at ambient temperature, in relatively dry environment. For example, the hydrophobic solution can be cured in an environment having less than 70% humidity, less than 60% humidity, less than 50% humidity, less than 40% humidity, less than 30% humidity, less than 20% humidity, less than 10% humidity, or at 0% humidity. Upon curing, the hydrophobic compound preferably forms a continuous hydrophobic layer on the fused frit or other surface treatment.

Without intending to be bound by theory, it is believed that in the case of a fluorosilane, bonding is achieved between surface Si—OH contained on and extending from the surface of the fused frit material or other modified top surface 10 surface, such as, for example, an acid etched surface, and the Si—OH groups of the silane. The surface hydroxyl groups can results from partial hydrolysis of the silane and the silicon dioxide in the fused frit material during heating. The Si—OH groups are caused to react with corresponding groups to form Si—O—Si linkages between the silane and the fused frit material. Correspondingly, Si—OH groups of adjacent silane molecules are also caused to react and form Si—O—Si cross linkages, thereby forming a continuous hydrophobic layer across the frit material. The method described herein will produce a hydrophobic surface that is a continuous border around the perimeter of the top surface 10 which will operate as a spill containment feature. The bonding of other hydrophobic materials to the modified top surface 10 can occur through chemical or physical adhesions mechanisms. It is believed that silane nanomaterials bind to the surface through an analogous binding mechanism as described for the binding of fluorosilanes, above. Other nanomaterials may bind through similar chemical adhesion mechanisms, through molecular rearrangement, or through interpenetration with the top surface 10. Electrodeposition, chemical vapor deposition, electrophoretic deposition, sputtering, and other physiochemical deposition methods yield materials bound to the top surface 10 through physiochemical and electrochemical bonds that are dependant on the chemical formulation of the deposited hydrophobic material.

One advantage of using a ceramic frit material to prepare the top surface 10 for coating with the hydrophobic solution as described herein, in addition to improving the durability of the hydrophobic surface, is that frit material is commercially available in multiple colors and can be printed in a manner which allows for the inclusion of designs, company names or logos in the surface area where the frit material is applied to the top surface 10.

Preferably, the hydrophobic pattern 18 is durable, and resists chipping, peeling, fading, and scratching. Advantageously, the hydrophobic pattern 18 can be designed to be resistant to abrasions from common household containers, such as, for example, pots, pans, cooking utensils, and other such cooking containers, as well as glass jars and other food containers. In addition, the hydrophobic pattern 18 can be designed to be resistant to most chemicals, such as for example, dish soap, Windex, Sparkle, Clorox wipes, and Formula 409 All Purpose Cleaner. The hydrophobic pattern 18 can resist multiple cleanings without experiencing a decrease in the spill containment pattern's ability to retain a spill.

It will be apparent to those skilled in the pertinent arts that other embodiments of cooking appliance and cooking appliance surfaces in accordance with the disclosure may be designed. That is, the principles of cooking appliance surfaces in accordance with the disclosure are not limited to the specific embodiments described herein. For example, cooking appliance surface having a spill containment pattern could be used in various settings, such as toaster ovens, indoor grilling appliances, or the like.

Further, it will be apparent to those skilled in the pertinent art that any method which may be used for creating a hydrophobic pattern in substantially the same plane as the top surface of the cooking appliance surface is within the scope of the disclosure described herein, even if such method requires the use of multiple pieces to manufacture the cooking appliance surface. For example, a frame of hydrophobic material may be bonded to the top surface of the cooking appliance surface such that it forms a continuous border which is generally in the same plane as the top surface. Accordingly, it will be apparent to those skilled in the art that modifications and other variations of the above-described illustrative embodiments of the disclosure may be effected without departing from the spirit and scope of the novel concepts of the invention.

We claim:

1. A cooking appliance having a spill containment pattern, comprising:
    a cooking appliance surface having a top surface, the top surface comprising a non-hydrophobic region;
    at least one heating element disposed on or adjacent to the cooking appliance surface; and
    a hydrophobic surface applied in a spill containment pattern to the top surface and bounding at least a portion of the non-hydrophobic region, the bounded non-hydrophobic region defining a non-hydrophobic spill containment region.

2. The cooking appliance of claim 1, wherein the hydrophobic surface is a continuous border which defines a single non-hydrophobic spill containment central region within said border.

3. The cooking appliance of claim 1, wherein the hydrophobic surface is a continuous border located near the perimeter of the top surface.

4. The cooking appliance of claim 1, wherein a portion of the hydrophobic surface surrounds the at least one heating element.

5. The cooking appliance of claim 1, wherein the hydrophobic surface comprises a frit disposed on and bonded to the top surface and a hydrophobic compound disposed on the frit.

6. The cooking appliance of claim 5, wherein the frit is a ceramic frit, a porcelain frit, or a combination thereof.

7. The cooking appliance of claim 1, wherein the hydrophobic surface comprises hydrophobic particles.

8. The cooking appliance of claim 1, wherein the hydrophobic surface has a thickness in the range of approximately 0.001 microns to approximately 250 microns.

9. The cooking appliance of claim 1, wherein the cooking appliance surface is selected from the group consisting of at least a portion of an oven interior, a cooktop cooking surface, and a stovetop cooking surface.

10. The cooking appliance of claim 1, comprising a plurality of heating elements, wherein the hydrophobic surface comprises portions surrounding each of the plurality of heating elements and/or surrounding portions of the top surface heated by the heating elements.

11. The cooking appliance of claim 1, further comprising a control unit disposed on or adjacent to the top surface, wherein a portion of the hydrophobic surface is disposed adjacent to the control unit and is arranged to repel spilled liquids away from the control unit.

12. A cooking appliance surface having a spill containment pattern, comprising:
    a top surface, wherein at least a portion of the top surface is adapted to be heated by a heating element, and at least a portion of the top surface is non-hydrophobic; and
    hydrophobic surface applied in a spill containment pattern to the top surface, the spill containment pattern bounding at least a portion of the non-hydrophobic region, the bounded non-hydrophobic region defining a non-hydrophobic spill containment region.

13. The cooking appliance surface of claim 12, wherein the hydrophobic surface is a continuous border which defines a single non-hydrophobic spill containment central region within said border.

14. The cooking appliance surface of claim 13, wherein the hydrophobic surface is a continuous border located near the perimeter of the top surface.

15. The cooking appliance surface of claim 12, wherein a portion of the hydrophobic surface surrounds the portion of the cooking appliance surface adapted to be heated by the heating element.

16. The cooking appliance surface of claim 12, wherein the hydrophobic surface comprises a frit disposed on and bonded to the top surface and a hydrophobic compound disposed on the frit.

17. The cooking appliance surface of claim 16, wherein the frit is a ceramic frit, a porcelain frit, or a combination thereof.

18. The cooking appliance surface of claim 12, wherein the hydrophobic surface comprises hydrophobic particles.

19. The cooking appliance surface of claim 12, wherein the hydrophobic surface has a thickness in the range of approximately 0.001 microns to approximately 250 microns.

20. The cooking appliance surface of claim 12, wherein the cooking appliance surface is selected from the group consisting of oven walls, a cooktop cooking surface, and a stovetop cooking surface.

21. The cooking appliance surface of claim 12, wherein hydrophobic is disposed in substantially the same plane as the top surface.

22. The cooking appliance surface of claim 12, wherein the cooking appliance surface comprises a plurality of regions adapted to be heated by a plurality of heating elements, and the hydrophobic surface comprises portions surrounding each of the plurality of regions adapted to be heated by the plurality of heating elements.

23. The cooking appliance surface of claim 12, further comprising a control unit disposed on or adjacent to the top surface, wherein a portion of the hydrophobic surface is disposed adjacent to the control unit and is arranged to repel spilled liquids away from the control unit.

24. The cooking appliance of claim 1, wherein the hydrophobic surface is in substantially the same plane as the non-hydrophobic region.

* * * * *